(12) United States Patent
Lee et al.

(10) Patent No.: US 9,560,189 B2
(45) Date of Patent: Jan. 31, 2017

(54) MOBILE TERMINAL WITH A DISPLAY THAT CAN BE BENT OR FLEXED

(71) Applicant: LG ELECTRONICS INC., Seoul (KR)

(72) Inventors: Seojin Lee, Seoul (KR); Samsick Kim, Seoul (KR); Donghwan Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/702,539

(22) Filed: May 1, 2015

(65) Prior Publication Data
US 2016/0105542 A1    Apr. 14, 2016

(30) Foreign Application Priority Data
Oct. 8, 2014    (KR) .......................... 10-2014-0136145

(51) Int. Cl.
| | | |
|---|---|---|
| *H04M 1/725* | (2006.01) | |
| *H04M 1/02* | (2006.01) | |
| *G06F 1/16* | (2006.01) | |
| *G06F 3/0488* | (2013.01) | |

(52) U.S. Cl.
CPC ........ *H04M 1/72597* (2013.01); *G06F 1/1652* (2013.01); *G06F 3/04886* (2013.01); *H04M 1/0268* (2013.01); *H04M 1/72522* (2013.01); *G06F 2203/04803* (2013.01)

(58) Field of Classification Search
CPC ............ H04M 1/72597; H04M 1/0268; H04M 1/172522; G06F 1/1652; G06F 3/04886; G06F 2203/04803
See application file for complete search history.

(56) References Cited

U.S. PATENT DOCUMENTS

| | | | | |
|---|---|---|---|---|
| 2010/0011291 A1* | 1/2010 | Nurmi | .................... | G06F 3/0414 715/702 |
| 2010/0060548 A1* | 3/2010 | Choi | ..................... | G06F 3/0414 345/1.3 |
| 2012/0115422 A1* | 5/2012 | Tziortzis | .................. | G06F 3/01 455/73 |
| 2012/0319960 A1* | 12/2012 | Kildal | ................... | G06F 3/0487 345/173 |

(Continued)

FOREIGN PATENT DOCUMENTS

| | | |
|---|---|---|
| EP | 2315186 | 4/2011 |
| EP | 2725471 | 4/2014 |

OTHER PUBLICATIONS

European Patent Office Application Serial No. 15183344.9, Search Report dated Feb. 19, 2016, 8 pages.

*Primary Examiner* — Brandon Miller
(74) *Attorney, Agent, or Firm* — Lee Hong Degerman Kang & Waimey

(57) ABSTRACT

The present disclosure relates to a mobile terminal in which part of the display unit can be bent or flexed, and a control method thereof. The mobile terminal may include a display unit with flexibility configured to be placed in a first state in which a specific region is planar and a second state in which the specific region is protruded, and a controller configured to change the specific region from the first state to the second state when an event has occurred in an application, and display an icon indicating the event in the specific region. Here, the controller may execute at least one function associated with the event when the second state is restored to the first state.

18 Claims, 24 Drawing Sheets

(56) References Cited

U.S. PATENT DOCUMENTS

| | | | |
|---|---|---|---|
| 2013/0296000 A1* | 11/2013 | Park | G09G 3/001 455/566 |
| 2013/0300682 A1* | 11/2013 | Choi | H04M 1/0268 345/173 |
| 2014/0004906 A1 | 1/2014 | Chi et al. | |
| 2014/0078047 A1* | 3/2014 | Seo | G06F 3/0487 345/156 |
| 2014/0098075 A1* | 4/2014 | Kwak | G06F 3/0487 345/204 |
| 2014/0320393 A1* | 10/2014 | Modarres | G06F 3/017 345/156 |
| 2015/0212548 A1* | 7/2015 | Namkung | G06F 1/1652 345/174 |

* cited by examiner

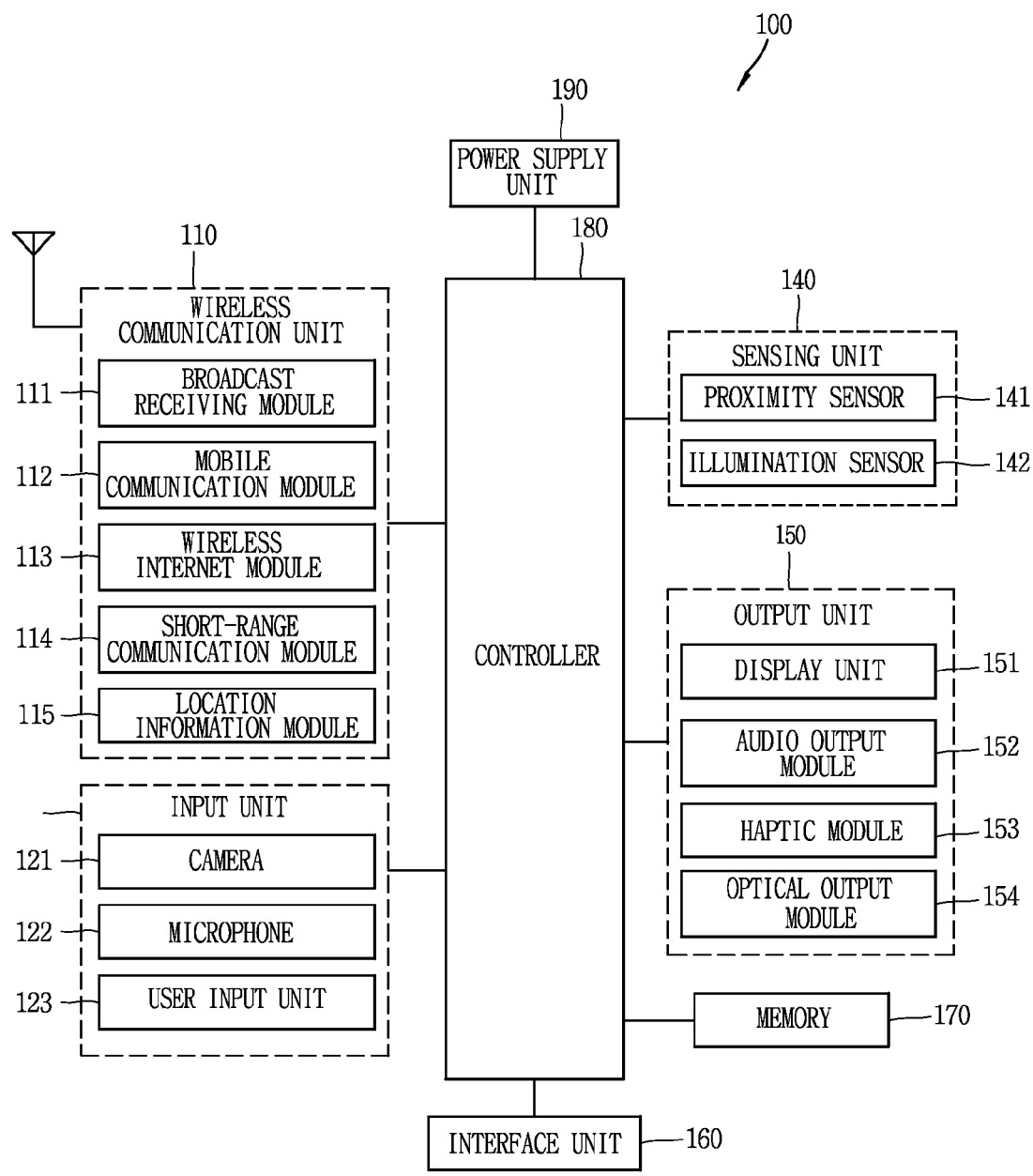

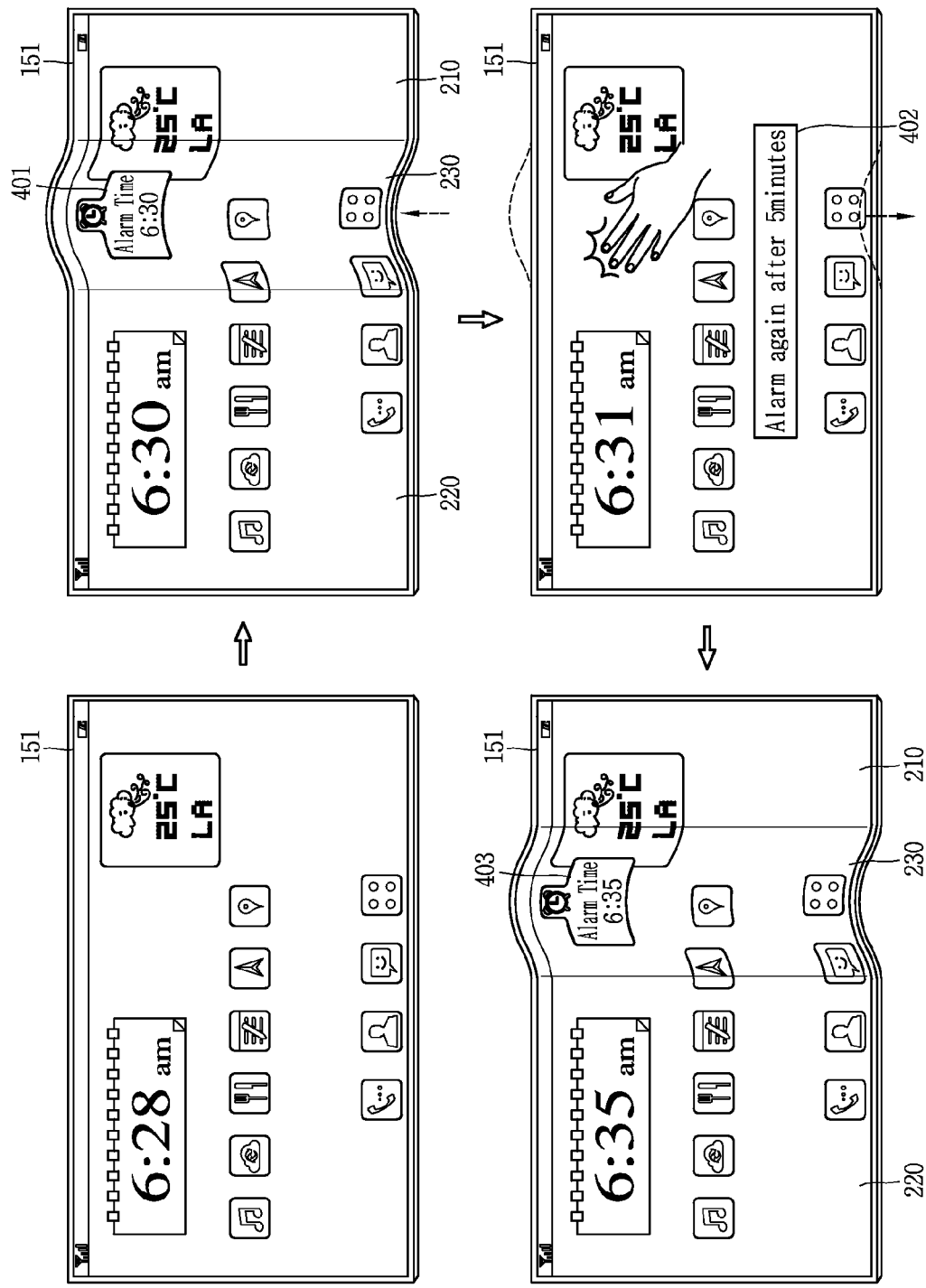

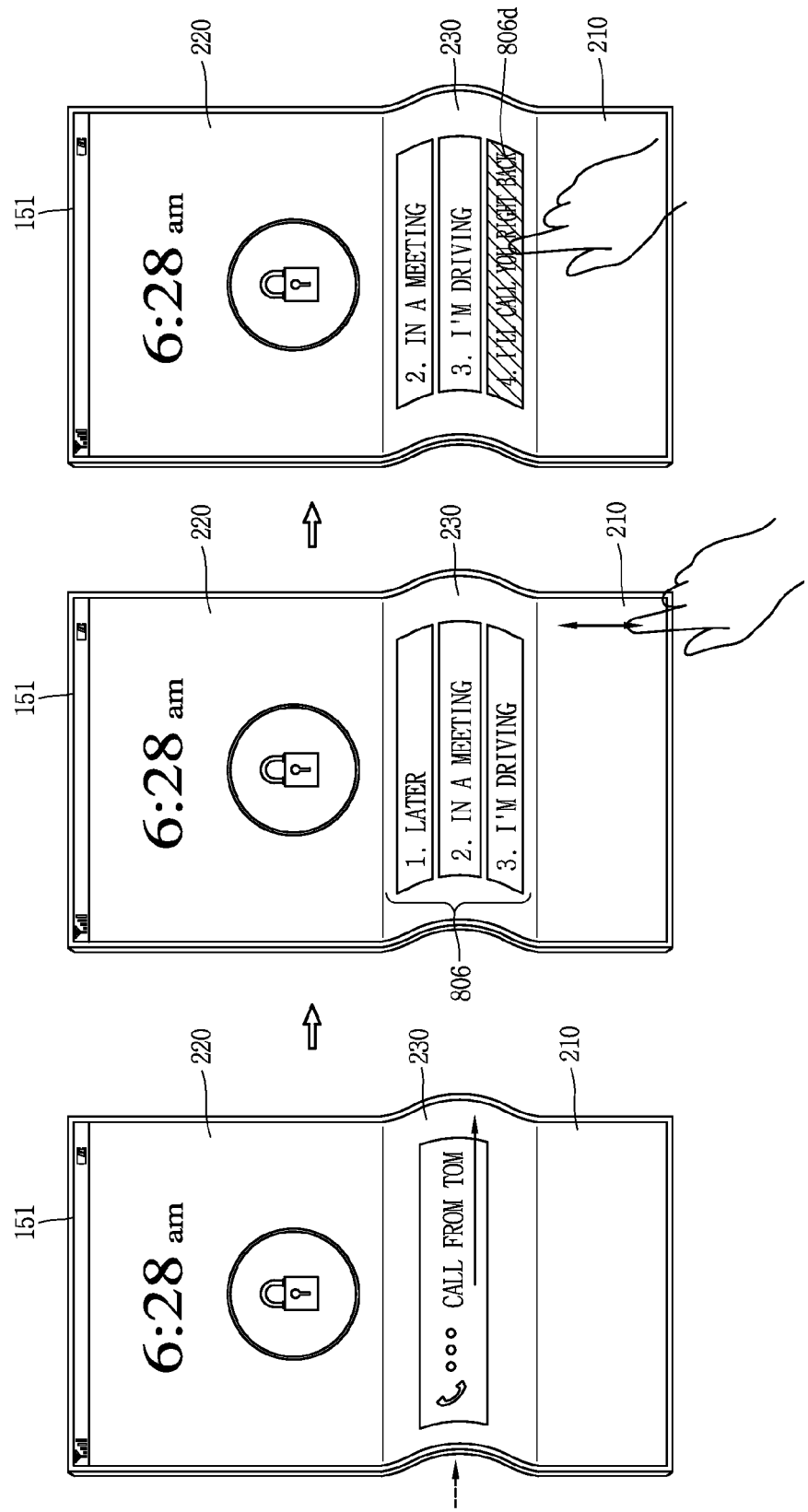

MOBILE TERMINAL WITH A DISPLAY THAT CAN BE BENT OR FLEXED

CROSS-REFERENCE TO RELATED APPLICATIONS

Pursuant to 35 U.S.C. §119(a), this application claims the benefit of earlier filing date and right of priority to Korean Patent Application No. 10-2014-0136145, filed on Oct. 8, 2014, the contents of which are all hereby incorporated by reference herein in their entirety.

BACKGROUND OF THE DISCLOSURE

1. Field of the Disclosure

The present disclosure relates to a mobile terminal in which part of the display unit can be bent or flexed, and a control method thereof.

2. Background of the Disclosure

Terminals may be divided into mobile/portable terminals and stationary terminals according to their mobility.

A mobile terminal may include all devices having a battery and a display unit, which are formed to display information on the display unit using power supplied from the battery, and can be carried by a user. Furthermore, the mobile terminal may include an apparatus for recording and playing video, an apparatus for displaying a graphic user interface (GUI), and the like, and may include a laptop computer, a portable phone, glasses and a watch for displaying screen information, a gaming device, and the like.

The functions of a mobile terminal have been diversified. The diversification of the functions of the mobile terminal have been implemented in the form of a multimedia player with complex functions. Furthermore, the improvement in the aspect of structure and/or software of a mobile terminal may be taken into consideration to support and enhance the functions of the mobile terminal.

The mobile terminal has been evolved with various forms of design, and ongoing efforts for developing the mobile terminal in a newly created form have been carried out to meet the needs of a user who wants new and various forms of design. The new form may include a structural change and improvement for allowing the user to use the mobile terminal in a more convenient manner. As one of the structural change and development, a mobile terminal in which at least part of the display unit can be bent or flexed has been received attention.

As such a mobile terminal in which at least part of the display unit can be bent or flexed has been received attention, a new user interface for which its application has been restricted or has not been allowed in the related art may be taken into consideration.

SUMMARY OF THE DISCLOSURE

An object of the present disclosure is to provide a mobile terminal capable of changing the physical shape of a display unit, part of which can be bent or flexible, to provide information to a user, and a control method thereof.

Furthermore, another object of the present disclosure is to provide a mobile terminal capable of entering a control command using a push input applied to the display unit, part of which is bent or flexed, and a control method thereof.

In addition, still another object of the present disclosure is to provide a mobile terminal capable of using part of the display unit on the bottom and another part thereof in an erected shape using the display unit, part of which is bent or flexed, as well as pulling, pushing or tilting the another part to enter a control command, and a control method thereof.

In order to accomplish the foregoing or other objectives, according to an aspect of the present disclosure, a mobile terminal according to the present disclosure may include a display unit with flexibility configured to be placed in a first state in which a specific region is planar and a second state in which the specific region is protruded, and a controller configured to change the specific region from the first state to the second state when an event has occurred in an application, and display an icon indicating the event in the specific region. Here, the controller may execute at least one function associated with the event when restoration from the second state to the first state by an external force being applied to the specific region is sensed.

Furthermore, according to an embodiment, the controller may control the displayed icon to disappear and screen information that has been hidden by the icon to reappear when the second state is restored to the first state by an external force being applied to the specific region.

Furthermore, according to an embodiment, the controller may control a screen change corresponding to the execution of at least one function associated with the event to appear on the display unit when the second state is restored to the first state by an external force being applied to the specific region.

Furthermore, according to an embodiment, the mobile terminal may further include a wireless communication unit configured to receive information from an external terminal, wherein when restoration from the second state to the first state by an external force being applied to the specific region is sensed while an indicator indicating that the information has been received is displayed in one region out of the specific region, the indicator disappears to notify that the information has been checked and the information is displayed on the icon for a predetermined period of time. Accordingly, it may be recognized that the user has checked received information.

Furthermore, according to an embodiment, when a plurality of touch inputs consecutively applied to the specific region are sensed while the indicator is displayed, the controller may maintain the display state of the indicator and restore the second state to the first state. Accordingly, the user can check received information later.

Furthermore, according to an embodiment, the controller may update information displayed on an icon using a touch input consecutively applied to the specific region with a predetermined time interval in response to the first state being changed again to the second state within a predetermined period of time and the icon indicating an event being displayed in the specific region. Accordingly, a plurality of events may be checked using a touch input to the specific region.

Furthermore, according to an embodiment, the specific region may include a first portion in which the icon is displayed and a second portion in which screen information that has been displayed in the first state is displayed, and the controller may limit the input of a control command to the second portion when a touch input is sensed in the specific region while maintaining the second state. Accordingly, a control command associated with an event may be sensed using a touch input to the specific region.

Furthermore, according to an embodiment, the controller may apply an external force to display guide information indicating an executable function in the specific region when the specific region is changed from the first state to the second state according to the occurrence of an event in the application.

Furthermore, according to an embodiment, the display unit may include a first region and a second region divided based on the specific region, and the controller may sense a control command for controlling the movement of information displayed on an icon using a touch input applied to at least one of the first and the second region while maintaining the second state when the icon indicating the event is displayed in the specific region. According to this, inconvenience generated in scrolling information displayed in a protruded region may be resolved.

Furthermore, according to an embodiment, when a drag input extended to either one of the first and the second region from the specific region is applied to the icon, the controller may display an input window associated with the processing of the event in the either one region. In particular, a response message may be written without releasing the lock state of the terminal, and an input region may be created based on a user direction.

Furthermore, according to an embodiment, the controller may control information created through the input window to be displayed in the specific region, and execute a transmission function for the displayed information when the second state is restored to the first state according to an external force being applied to the specific region. According to this, the state of the specific region may be changed to simply transmit a response message.

Furthermore, according to an embodiment, the controller may determine the display direction of the input window based on the drag direction of the drag input, and display detailed information associated with the event in the other one of the first and the second region when the second state is restored to the first state by the drag input. According to this, screen information associated with an event may be displayed based on a user direction.

Furthermore, according to an embodiment, the mobile terminal may further include a wireless communication unit configured to transmit and receive wireless signals, and when a call signal is received through the wireless communication unit, the controller may control the specific region to be changed from the first state to the second state and display an indicator indicating that the call signal is received in the specific region. Here, the icon may indicate that the call signal has been unanswered.

Furthermore, according to an embodiment, the controller may display a notification icon indicating that the call signal is released from the connection and the call signal is rejected in the specific region when the second state is restored to the first state by an external force being applied to the specific region while the indicator is displayed. Specifically, a call signal reject function may be carried out when the state of the specific region is changed while the indicator is displayed, and a check function for the unanswered call signal may be carried out when the state for the specific region is changed while the icon is displayed.

Furthermore, according to an embodiment, the controller may connect the call signal when a first touch input is applied to the indicator, and display screen information for transmitting a reject message to the call signal when a second touch input is applied to the indicator while the indicator is displayed.

Furthermore, according to an embodiment, when a plurality of touch positions applied to one surface and the other surface formed based on a protruded portion of the specific region being pressed in directions of being closer to each other are sensed while the second state is maintained, the controller may restore the second state to the first state and redisplay an icon indicating the event with a predetermined time interval. In other words, a snooze function for event notification may be carried out.

Furthermore, according to an embodiment, the controller may set the predetermined time interval such that a plurality of touch positions applied to the one surface and the other surface are proportional to at least one of the pressed level and number of times thereof. According to this, the user may determine an event notification interval.

Furthermore, according to an embodiment, when a touch input is sensed on the icon in a state that a pressure to a plurality of touch positions applied to the one surface and the other surface is maintained, the controller may sequentially execute a first function associated with the event and a second function associated with the first function. According to this, a plurality of processing for an event can be made.

Furthermore, according to an embodiment, in case where the mobile terminal further includes a wireless communication unit configured to transmit and receive wireless signals, when a call signal is received through the wireless communication unit in a state that the display unit is in an inactive state, the controller may switch the specific region to an active state while changing it from the first state to the second state and maintain a region out of the specific region in an inactive state.

Furthermore, when the display unit includes a first region and a second region divided based on the specific region, it may be possible to sense a change to a third state in which part of the specific region varies by an external force being applied to the other one in a state that either one of the first and the second region is placed on a bottom surface and the other one thereof is erected based on the specific region as the specific region is placed in the second state. In this case, the controller may control at least one function associated with screen information that has been displayed on the other one to be executed in response to the specific region being changed from the second state to the third state, and the specific region may be restored from the third state to the second state subsequent to a predetermined period of time. Here, screen information that has been displayed on the other one may include a notification icon indicating an event.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1 is a block diagram illustrating a mobile terminal associated with the present disclosure;

FIG. 4 is a representative conceptual view for explaining a control operation of a mobile terminal according to an embodiment of the present disclosure;

FIGS. 8A through 8C are conceptual views for explaining various methods for processing a call signal using a touch input to the deformed specific region in a mobile terminal according to an embodiment of the present disclosure;

DETAILED DESCRIPTION OF THE PREFERRED EMBODIMENTS

Figure 2A:
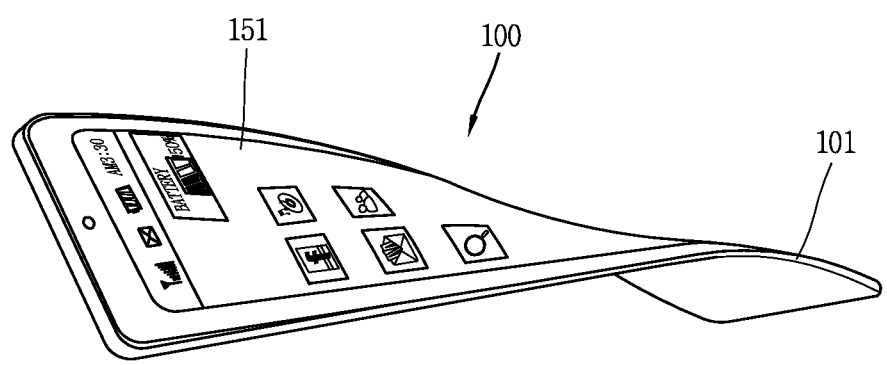
FIGS. 2A and 2B are conceptual views illustrating an example in which a mobile terminal associated with the present disclosure is seen from different directions.

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

FIG. 1 is a block diagram of a mobile terminal in accordance with the present disclosure.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a bendable display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window (not shown) and a display (not shown) on a rear surface of the window or patterned directly on the rear surface of the window (not shown). Otherwise, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1).

The interface unit 160 may generally be implemented to interface the mobile terminal with external devices connected to the mobile terminal 100. The interface unit 160 may allow a data reception from an external device, a power delivery to each component in the mobile terminal 100, or a data transmission from the mobile terminal 100 to an external device. The interface unit 160 may include, for example, wired/wireless headset ports, external charger ports, wired/wireless data ports, memory card ports, ports for coupling devices having an identification module, audio Input/Output (I/O) ports, video I/O ports, earphone ports, and the like.

Furthermore, the memory 170 stores data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function in a substitute or additional manner in another module of the wireless communication unit 110 to obtain data for the location of the mobile terminal. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

On the other hand, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

On the other hand, the touch sensor may be formed to sense a touch input using a different scheme in an active or inactive state of the display unit 151. At this time, the different scheme may be associated with an active period of the touch sensor. More specifically, the touch sensor may be activated with a different period according to whether or not the display unit 151 is activated. In other words, the touch sensor may have a different active period according to whether or not the display unit 151 is activated to sense a touch input applied to the touch sensor.

For example, when the display unit 151 is in an inactive state, the touch sensor may be activated with a preset specific period. In this case, the specific period may be a period corresponding to a time greater than zero. Furthermore, when the display unit 151 is in an active state, the touch sensor may be always operated in an active state. In other words, in this case, an activated period of the touch sensor may be a period having a time zero or very close to zero.

Whether or not the touch sensor is activated may be determined using the power consumption of the touch sensor. For example, the touch sensor may correspond to an inactive state when the power consumption of the touch sensor is less than a preset reference value based on zero, and may be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor may be activated for each a preset specific period.

On the other hand, as reducing a specific period in which the touch sensor is activated, a speed for sensing a touch input hitting the display unit 151 may increase, but accordingly power consumed by the touch sensor may also increase. On the contrary, as increasing the period in which the touch sensor is activated, a speed for sensing a touch input hitting the display unit 151 may decrease though power consumed by the touch sensor decreases.

Accordingly, the specific period may be set to enhance the efficiency of power consumption while the sensing speed is fast enough to the extent that cannot be recognized by the user in sensing a touch input hitting the display unit 151. For example, the specific period may be set such that the touch sensor is inactive and then active 20 times (Hz) per second.

On the other hand, while the display unit 151 is in an active state, the touch sensor may be also activated, and the active period (T) in an active state may be zero or very close to zero. Otherwise, the period of the touch sensor while the touch sensor is in an active state may be shorter several times than a specific period set to activate the touch sensor while the display unit 151 is in an inactive state.

On the other hand, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 may switch the doze mode to an active mode in which the display unit and touch sensor are activated.

In addition, the touch sensor may be driven with a different period based on the state of the display unit 151. For example, the touch sensor may execute a doze mode when the display unit 151 is in a closed state, and execute an active mode when switching from the closed state to an open state.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.). The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

On the other hand, the camera 121 may include at least one of a first camera formed on a front surface of the mobile terminal body and a second camera formed on a rear surface thereof.

The first camera may process video frames such as still or moving images obtained by the image sensor in a video call mode or a capture mode. The processed video frames may be displayed on the display unit 151 or stored in the memory 170.

The second camera may include a plurality of lenses arranged along at least one line. The plurality of lenses may also be arranged in a matrix configuration. The cameras may be referred to as an 'array camera.' When the second camera is implemented as the array camera, images may be captured in various manners using the plurality of lenses and images with better qualities may be obtained.

A flash (not shown) may be disposed adjacent to the second camera. When an image of a subject is captured with the camera, the flash (not shown) may illuminate the subject.

Furthermore, an electromagnetic wave generator (not shown) may be disposed adjacent to the second camera. When the second camera is activated, the electromagnetic wave generator emits the generated electromagnetic wave.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

The first audio output module 152 may include at least one of a first audio output module and a second audio output module. The first audio output module may be implemented in the form of a receiver for transferring voice sounds to the user's ear, and the second audio output module may be implemented in the form of a loud speaker for outputting various alarm sounds or multimedia reproduction sounds.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like. When a user's event check is sensed, the controller 180 may control the optical output module 154 to terminate the output of light.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Various embodiments to be explained later may be implemented in a computer or a computer-readable recording medium, by software, hardware, or a combination thereof.

Figure 2B:
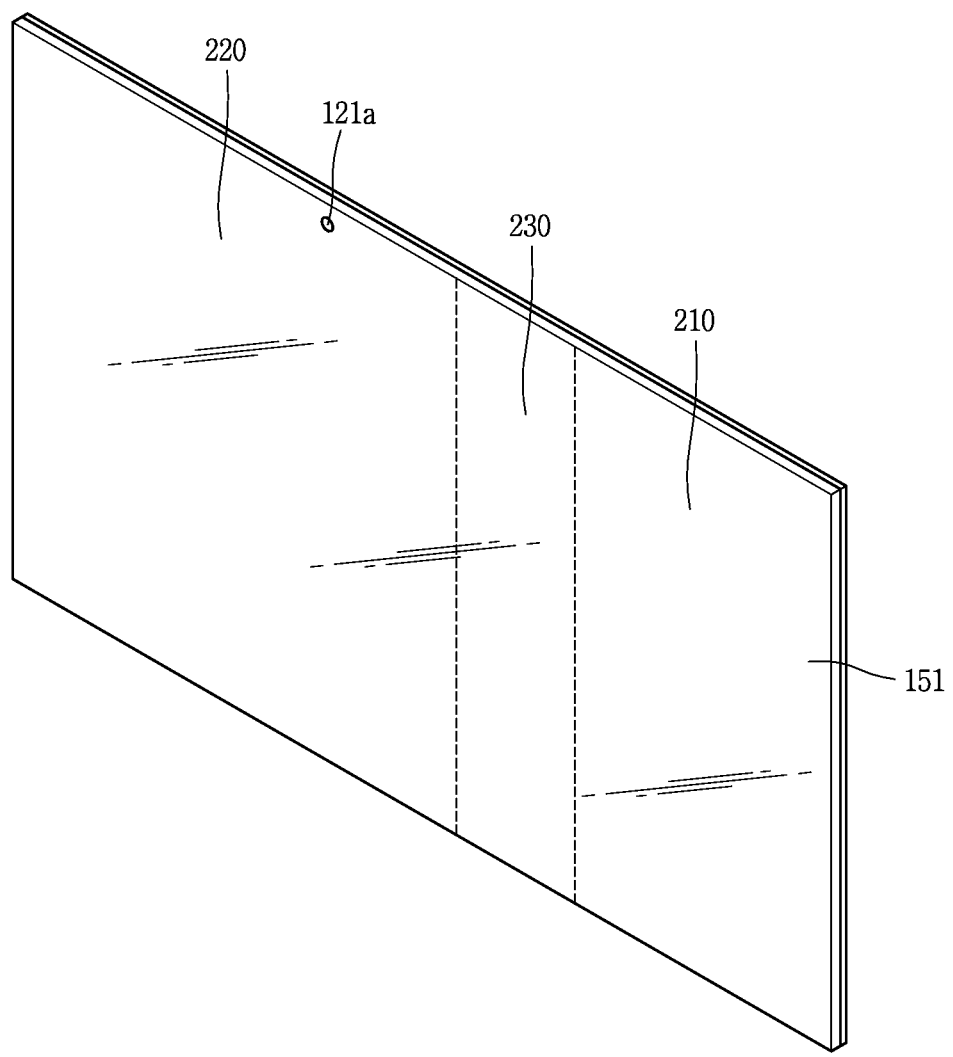

Referring to FIGS. 2A and 2B, the mobile terminal 100 disclosed herein may include a bar-shaped mobile terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The present disclosure relates to a specific type of mobile terminal, but the description of a specific type of mobile terminal may be also applicable to another type of mobile terminal in general.

Here, it may be understood that the body of a mobile terminal is a concept of the mobile terminal 100 being called as at least one aggregate. Otherwise, the body of a mobile terminal may be referred to as a main body.

The mobile terminal 100 may include a case (for example, a frame, a housing, a cover, etc.) constituting the appearance thereof. As illustrated in the drawing, the mobile terminal 100 may include a case 101, and the case 101 may include a front case and a rear case. Various electronic components are disposed in an inner space formed by coupling the front case to the rear case. At least one middle case may be additionally disposed between the front case and the rear case.

The case 101 may be configured to be deformable along with the flexible display unit 151 by an external force in consideration of the characteristics of the flexible display unit 151. In other words, the flexible display unit 151 may be formed to be bent or folded along with the case 101.

For example, the case 101 may be formed of deformable materials such as plastics, thin glasses, fibrous components, thin metals (for example, aluminum, etc.), or a combination of those materials.

On the other hand, part of the case 101 may be formed of a dielectric or low conductive material, and the case 101 or at least part of the structure constituting the case 101 may be formed of a metallic element.

The display unit 151 may be disposed on a front surface of the mobile terminal body to display information. As illustrated in the drawing, the display unit 151 may be mounted on the case 101 to form a front surface of the mobile terminal body.

According to circumstances, electronic components may be mounted on the rear case. The electronic components that can be mounted on the rear case may include a detachable battery, an identification module, a memory card, and the like. In this case, a rear cover for covering electronic components mounted thereon may be combined with the rear case in a detachable manner. Accordingly, when the rear cover is separated from the rear case, electronic components mounted on the rear case may be exposed to the outside. Meanwhile, an opening portion for exposing the camera or audio output unit to the outside may be provided in the rear cover.

Contrary to the foregoing example in which a plurality of cases are provided to accommodate various electronic components, one case may be configured to provide the inner space. In this case, the mobile terminal 100 with a unibody in which synthetic resin or metal is extended from a lateral surface to a rear surface may be implemented.

On the other hand, the mobile terminal 100 may include a waterproof portion (not shown) through which water is not infiltrated into the mobile terminal body. For example, the waterproof portion may be provided between the front case and the rear case or between the rear case and the rear cover to include a waterproof member for sealing the inner space while combining them together.

The mobile terminal 100 may include a display unit 151, an audio output unit 152, an optical output unit 154, a second camera 121, a microphone 122, and the like.

The display unit 151 may be disposed on a front surface of the mobile terminal 100. The display unit 151 displays (outputs) information processed by the mobile terminal 100. For example, the display unit 151 may display an execution screen information of an application program driven by the mobile terminal 100 or user interface (UI) or graphic user interface (GUI) information based on the execution screen information.

The display unit 151 may include at least one of a liquid crystal display (LCD), a thin film transistor-liquid crystal display (TFT LCD), an organic light emitting diode (OLED), a three-dimensional (3D) display, and an e-ink display.

On the other hand, the display unit 151 may be deformable by an external force. The deformation may be at least one of curving, bending, folding, twisting and rolling of the display unit 151. The deformable display unit 151 may be referred to as a 'flexible display unit' or 'bendable display unit.' Here, the flexible display unit 151 may include both a general flexible display and an e-paper.

The general flexible display denotes a light, non-fragile display, which still exhibits characteristics of the conventional flat panel display and is fabricated on a flexible substrate which can be curved, bent, folded, twisted or rolled.

Also, the e-paper is a display technology employing the characteristic of a general ink, and is different from the conventional flat panel display in view of using reflected light. The e-paper may change information by using a twist ball or an electrophoresis using a capsule.

In a state that the flexible display unit 151 is not deformed (for example, in a state with an infinite radius of curvature, hereinafter, referred to as a first state), a display region of the flexible display unit 151 may become a flat surface. In a state that the flexible display unit 151 is deformed from the first state by an external force (for example, a state with a finite radius of curvature, hereinafter, referred to as a second state), the display region may become a curved surface (or a bent surface). As illustrated, information displayed in the second state, may be visual information output on the curved surface. The visual information may be realized in such a manner that a light emission of each unit pixel (sub-pixel) arranged in a matrix configuration is controlled independently. The unit pixel denotes an elementary unit for representing one color.

The flexible display unit 151 may be placed in a curved state (for example, a state of being curved from up to down or from right to left), other than a flat state, in the first state. In this case, when an external force is applied to the flexible display unit 151, the flexible display unit 151 may be deformed back into the flat state or into a more curved state.

The flexible display unit 151 may be formed of materials with several layers. For example, the flexible display unit 251 may implement a flexible touch screen by a combination with a touch sensor. When a touch is input onto the flexible touch screen, the controller 180 (see FIG. 1) may execute a control corresponding to the touch input. The flexible touch screen may be configured to sense a touch input even in the second state as well as in the first state. The touch sensor may be disposed on a substrate of the display or provided within the display.

In this manner, the flexible display unit 151 may form a flexible touch screen along with the touch sensor, and in this case, the touch screen may function as the user input unit 123 (refer to FIG. 1).

On the other hand, the state deformation of the flexible display unit 151 may not be necessarily limited to an external force. For example, when the flexible display unit 151 is in a non-deformed state, it may be deformed to a deformed state by a user or application's command. More specifically, the mobile terminal 100 may include a drive unit (not shown), and may be deformed from a non-deformed state to a deformed state by driving the drive unit other than the external force when corresponding to a preset condition.

Furthermore, the mobile terminal 100 according to an embodiment of the present disclosure may include a deformation sensor which senses the deformation of the flexible display unit 151. The deformation sensor may be included in the sensing unit 140 (see FIG. 1).

The deformation sensor may be disposed in the flexible display unit 151 or a case 101 to sense information related to the deformation of the flexible display unit 151. Here, the information associated with deformation may be a deformed direction, a deformed degree, a deformed position, a deformed time, an acceleration that the deformed flexible display unit 151 is restored, and the like, and in addition, may be various information which is sensible due to the bending of the flexible display unit 151.

Furthermore, the controller 180 may change information displayed on the flexible display unit 151 or generate a control signal for controlling the function of the mobile terminal 100 based on information associated with the deformation of the flexible display unit 151 sensed by the deformation sensor.

For example, when the flexible display unit 151 is bent in response to an external physical force, the controller 180 may rearrange, separate, combine or change screen images previously displayed on the flexible display unit 151 according to a bent direction, a bent angle or a return acceleration for returning to an original state.

More specifically, when the flexible display unit 151 is bent in an inward direction due to an external physical force, the controller 180 may display screen images displayed on the flexible display unit 151 to be close to each other. Otherwise, on the contrary, screen images displayed on the flexible display unit 151 may be displayed to be separated from each other.

On the other hand, the mobile terminal 100 according to the modified example may include a case for accommodating the flexible display unit 151. The case may be configured to be deformable along with the flexible display unit 151 by an external force in consideration of the characteristics of the flexible display unit 151. In other words, the flexible display unit 151 may be formed to be bent along with the case 101.

For example, the case may be formed of deformable materials such as plastics, thin glasses, fibrous components, thin metals (for example, aluminum, etc.), or a combination of those materials.

On the other hand, part of the case may be formed of a dielectric or low conductive material, and the case or at least part of the structure constituting the case may be formed of a metallic element.

On the other hand, for another example of the user input unit 123, one or a plurality of rear input units may be provided on a rear surface of the case. The rear input units are manipulated to enter a communication for controlling the operation of the mobile terminal 100, and the content being entered may be set in various ways. For example, commands such as power on/off, start, end, scroll, and the like, commands such as adjustment of audio volume output from the audio output unit 152, switching to a touch recognition mode of the flexible display unit 151, and the like may be entered. The rear input unit may be implemented in the form of allowing a touch input, a push input or a combination thereof.

The rear input unit may be disposed to overlap the display unit 151 on the front surface thereof in a thickness direction of the mobile terminal body. Furthermore the rear input unit may be disposed at a location adjacent to both left and right ends of the case. As a result, the rear input unit may be located on a rear surface of the mobile terminal 100 in a planar state in which the case is not bent, and located on a front surface of the mobile terminal 100 when both the left and right ends of the case are bent to face each other. However, the present disclosure may not be necessarily limited to this, the location and number of the rear input unit can be changed.

On the other hand, the mobile terminal 100 may include a fingerprint recognition sensor for recognizing a user's fingerprint, and the controller 180 may use fingerprint information sensed through the finger recognition sensor as an authentication means. The finger recognition sensor may be integrated into the flexible display unit 151 or user input unit 123.

The microphone 122 may be configured to enter the user's voice, other sounds, and the like. The microphone 122 may be provided at a plurality of positions to receive stereo sounds.

A rear camera may be disposed on a rear surface of the mobile terminal body. The rear camera may have a capture direction substantially opposite to the front camera 121*a*.

Furthermore, the front camera 121*a* may be disposed at an opening portion formed on part of the flexible display unit 151 as illustrated in FIG. 2B. Otherwise, the front camera 121*a* may be disposed at an opening portion formed on part of the case disposed on a front surface thereof.

The rear camera processes the image frames of still images or video obtained by the image sensor in a capture mode or video call mode. The processed image frames may be displayed on the flexible display unit 151, and stored in the memory 170.

Furthermore, at least one antenna for wireless communication may be provided in the body of the mobile terminal 100. The antenna may be integrated into the body of the mobile terminal or formed on the case. For example, the antenna constituting the broadcast receiving module 111 (refer to FIG. 1) may be configured to be retractable from the body of the mobile terminal. Otherwise, the antenna may be formed in a film type and adhered to an inner surface of the rear cover, and a case containing a conductive material may be configured to function as an antenna.

Moreover, a battery (not shown) provided in the mobile terminal 100 may be also configured to be deformed along with the flexible display unit 151 by an external force in consideration of the characteristics of the flexible display unit 151. A stack and folding method for stacking up battery cells may be applicable to implement the battery.

Furthermore, though not shown in the drawing, the input unit 160 (refer to FIG. 1) may be disposed on a lateral surface of the body of the mobile terminal. The interface unit 160 serves as a path allowing the mobile terminal 100 to exchange data with an external device. For example, the interface unit 160 may be at least one of a connection terminal for connecting to an external device (for example, an earphone, an external speaker), a port for near field communication (for example, an Infrared Data Association (IrDA) port, a Bluetooth port, a wireless LAN port, etc.), and a power supply terminal for supplying power to the mobile terminal 100. The interface unit 160 may be implemented in the form of a socket for accommodating an external card such as Subscriber Identification Module (SIM) or User Identity Module (UIM), and a memory card for information storage.

The battery (not shown) may be configured to receive power via a power cable connected to the interface unit 160. Furthermore, the battery may be configured to allow wireless charging via a wireless charger. The wireless charging may be implemented by a magnetic induction or resonance (magnetic resonance) scheme.

The mobile terminal 100 including at least one of the foregoing constituent elements is formed to deform at least part of the flexible display unit 151 in a convex or concave manner. Furthermore, in this case, when the occurrence of an event in at least one application is sensed, the controller 180 may control part of the flexible display unit 151 to be deformed in a convex (or concave) manner, thereby notifying an event. At this time, when the user applies a push input or touch input to a portion being deformed in a convex (or concave) manner, it may be possible to control various functions associated with the event.

Hereinafter, various embodiments for deforming a partial shape of the flexible display unit 151 along with the structure of the flexible display unit 151 to notify the occurrence of an event or control a function associated with the event will be described in more detail with reference to the accompanying drawings.

First, the appearance characteristics of the flexible display unit 151 according to an embodiment of the present disclosure will be described.

FIG. 2B is a front view illustrating an example in which the display unit is formed on a single plane in a mobile terminal associated with the present disclosure, and FIGS. 3A, 3B, 3C and 3D are front views illustrating various examples in which at least part of the display unit is deformed in a mobile terminal associated with the present disclosure.

Referring to the drawings, the mobile terminal 100 may include a case 101 constituting the appearance thereof, a flexible display unit 151 disposed on a front surface thereof, and a sensing unit (or deformation sensor) 140 (refer to FIG. 1).

The flexible display unit 151 may be formed in a bendable or foldable manner.

Here, folding denotes a state in which a partial curvature radius of the mobile terminal body is maintained to be less than a reference value, and corresponds to a folded state in plain language. In case of folding, the screens of the display unit may be brought into contact to face each other or located close to each other. On the contrary, bending denotes a state in which a partial curvature radius of the mobile terminal body is maintained to be greater than a reference value, and corresponds to a bent state in plain language.

Furthermore, folding and bending may be determined by the extent of being bent. For example, being bent at an angle greater than a predetermined angle may be defined as folding, and being bent at an angle equal to or less than the predetermined angle may be defined as bending. Furthermore, when the curvature radius is greater than the reference value even though bent at an angle greater than a predetermined angle may be defined as bending.

Referring to the drawings, the mobile terminal may be switched from a state in which the flexible display unit 151 is formed on a single plane to a state in which at least part of the flexible display unit 151 is changed in shape. The state of being changed in shape may be a state in which the flexible display unit 151 is bent at least one pair of positions to allow a specific region to be protruded. In other words, the flexible display unit 151 may be configured to be placed in a first state in which the specific region is planar (refer to FIG. 2B) and a second state in which the specific region is protruded (or recessed), respectively. In this case, the second state may be a state in which the specific region 230 is protruded based on the front surface of the mobile terminal.

Figure 3A:
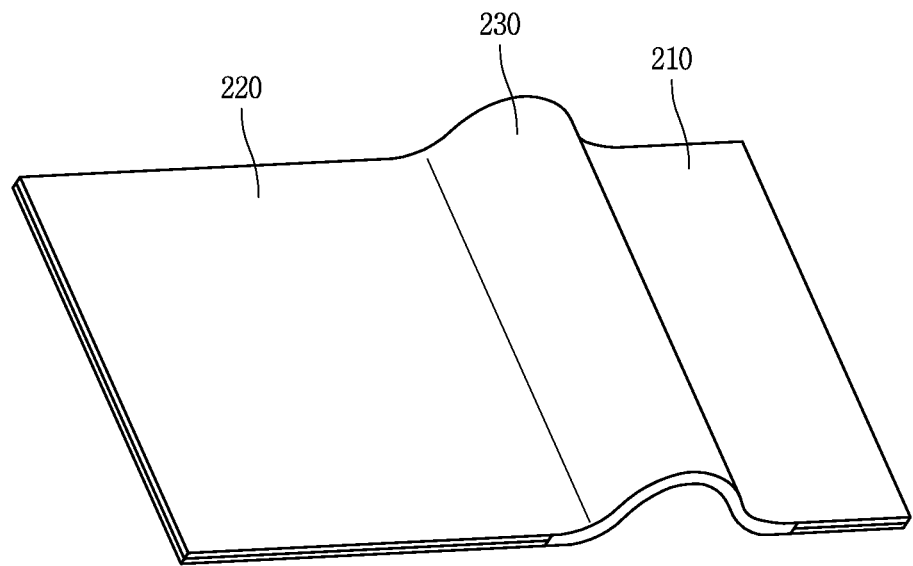
FIGS. 3A, 3B, 3C and 3D are perspective views illustrating various examples in which a specific region of the display unit is deformed in a mobile terminal associated with the present disclosure.

Referring to FIG. 3A, the flexible display unit 151 may include a first region 210 and a second region 220 divided based on the specific region 230. More specifically, the specific region 230 on the flexible display unit 151 may be a region disposed between the first region 210 and the second region 220.

Here, the first region 210 may be a region disposed at one side of the flexible display unit 151, and the second region 220 may be a region disposed at the other side of the flexible display unit 151. Accordingly, the specific region 230 may be a central portion rather than an edge of the flexible display unit 151. Furthermore, the specific region 230 may be formed to be elongated in one direction, and configured to allow the entire region to be deformed in a predetermined ratio.

In this case, the entire body of the mobile terminal may be deformed along with the flexible display unit 151. Accordingly, a portion corresponding to the specific region is deformed in a concave manner on a rear surface of the mobile terminal.

On the other hand, the mobile terminal may be configured such that only the specific region 230 is flexible. In this case, the mobile terminal may be configured such that it is foldable based on the specific region, but the first region 210 and second region 220 are non-flexible.

Referring to the drawings again, when the mobile terminal is flexible as a whole, the specific region 230 may be previously set to a predetermined region of the entire region of the mobile terminal body. Meanwhile, according to another example, the specific region 230 may not be previously set but may be the entire region of the mobile terminal.

Figure 3B:
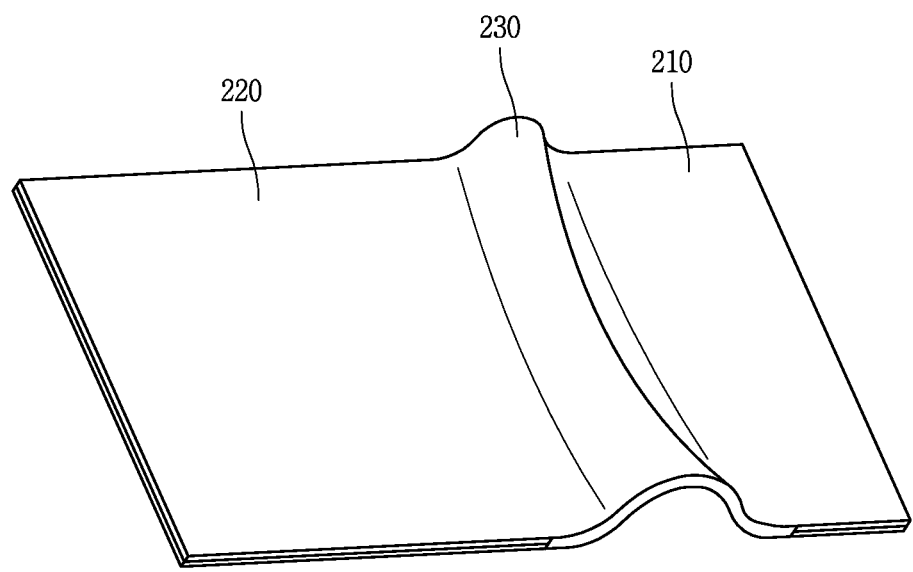
Figure 3C:
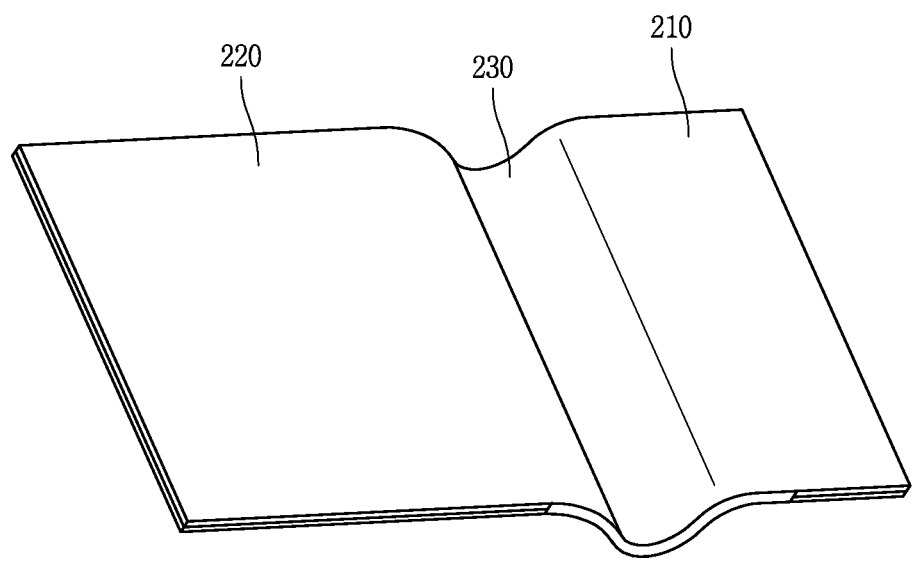

Furthermore, referring to FIG. 3B, the specific region 230 of the mobile terminal may be not be flexed in a predetermined ratio but deformed in an irregular shape. For another example, referring to FIG. 3C, the mobile terminal may not be deformed in a convex manner but deformed in a concave manner based on the front surface of the flexible display unit 151.

Figure 3D:
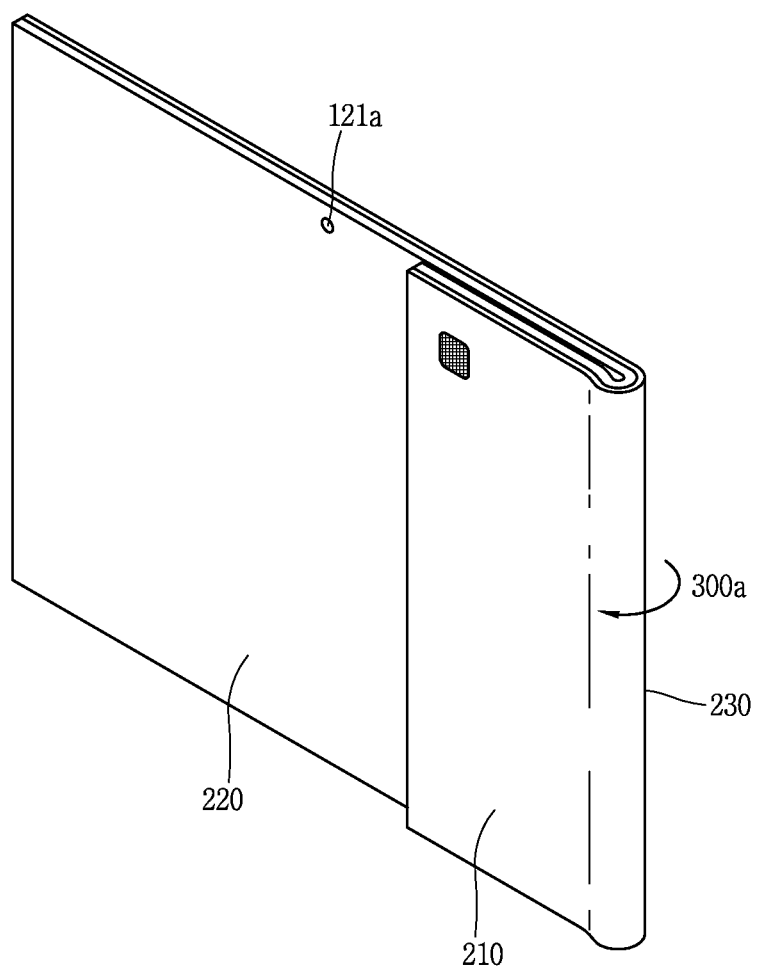

Furthermore, referring to FIG. 3D, the mobile terminal may be configured to be folded based on the specific region 230. In other words, the flexible display unit 151 may be bent while at the same time being rotated using the specific region 230 as an axis. For example, the left end (first region) of the mobile terminal body may be rotated in a first arrow direction 300*a* using the specific region 230 as an axis to be bent or deformed. In this case, part of the first and the second region may be overlapped with each other, thereby implementing a foldable display. Meanwhile, for another example, the left end (first region) of the mobile terminal body may be rotated in a direction facing the first arrow direction 300*a* using the specific region 230 as an axis to be bent or deformed.

Furthermore, though not shown in the drawing, the flexible display unit 151 may include a plurality of specific regions 230. In this case, the left and right ends of the mobile terminal body are folded using the plurality of specific regions 230 as axes, respectively, to provide a dual foldable display.

As described above, the mobile terminal according to the present disclosure may be configured such that the specific region of the flexible display unit is deformed in a convex or concave manner. Hereinafter, embodiments associated with the control operation associated with the deformation of the specific region when an event occurs will be described in more detail with reference to the accompanying drawings.

First, referring to FIG. 4, the control operation of the mobile terminal when a specific region of the flexible display unit is deformed will be described.

Referring to FIG. 4, the flexible display unit 151 of the mobile terminal 100 according to the present disclosure may include a first region 210, a second region 220 and a specific region 230. Specifically, the first region 210 and the second region 220 are disposed at both sides of the flexible display unit 151 based on the specific region 230. In other words, the specific region 230 may be disposed between the first region 210 and the second region 220.

Subsequently, referring to FIG. 4, a home screen page may be displayed on a front surface of the flexible display unit 151. The screen page may include at least one object, and the object may be an icon or widget of an application installed in the mobile terminal. Furthermore, the home screen page may be displayed over the entire region having the first region 210, second region 220 and specific region 230. However, the present disclosure may not be necessarily limited to this, and different information may be displayed in the first region 210 and second region 220 as they have different types of graphic user interfaces (GUIs).

Furthermore, screen information associated with a currently executed application rather than a home screen page may be displayed on the flexible display unit 151.

When an event occurs in at least one application in a state that screen information associated with a home screen page or currently executed application is displayed, the controller 180 (refer to FIG. 1) of the mobile terminal 100 displays an icon 401 indicating the event as illustrated in FIG. 4. Here, a pop-up window in which information indicating that it reaches a preset alarm time is illustrated as an icon indicating the event. At the same time, a preset alarm sound may be output.

Furthermore, the controller 180 may control the specific region 230 to be protruded upward based on the front surface of the mobile terminal. then, the controller 180 may sense the switching of the state of the flexible display unit 151 using the sensing unit 140 (refer to FIG. 1). Here, switching from a state in which the specific region 230 is planar to a state in which the specific region 230 is protruded may be referred to as the specific region 230 being switched from a first state to a second state.

On the other hand, when the specific region 230 of the flexible display unit 151 is restored from a protruded state to a planar state as applying an eternal force to the flexible display unit 151 subsequent to sensing the switching of the state of the flexible display unit 151, the controller 180 senses a change of the shape of the flexible display unit 151 through the sensing unit 140.

Here, a change of the state is carried out by an external physical force applied to the flexible display unit 151, and the external force may be applied by a user or another object (for example, stylus pen, etc.) other than the user.

Furthermore, here, the restoration of the specific region 230 from a protruded state to a planar state may referred to as the specific region 230 being switched from a second state to a first state.

As illustrated in FIG. 4, the user pushes the specific region 230 protruded upward to be unfolded flat again, the state of the specific region 230 is restored, and the controller 180 executes a function associated with the event. Here, the function of ending an alarm is carried out.

At this time, as the state of the specific region 230 is restored, an icon that has been displayed in the specific region 230 may disappear subsequent to displaying an icon that has been displayed in the specific region 230 for a predetermined period of time.

At this time, when a re-alarm function is previously set, an indicator 402 indicating information associated with re-alarm may be displayed in the specific region 230 or at least one of the first region 210 and second region 220 as the state of the specific region 230 is restored. For example, information associated with a re-alarm time interval may be displayed on the indicator 402.

In this case, when reaches a re-alarm time, the controller 180 may display an icon 401 indicating re-alarm in the specific region 230, and control the state of the specific region 230 to be protruded upward again as illustrated in FIG. 4.

According to a drive method of the foregoing mobile terminal 100, when an event occurs, the event may be notified to the user to easily know it, thereby more easily performing the processing.

Hereinafter, the control operation of a mobile terminal according to an embodiment of the present disclosure will be described in more detail with reference to FIG. 5. The mobile terminal 100 according to an embodiment of the present disclosure is configured to be place in a first state in which the specific region 230 (refer to FIG. 2B) of the display unit 151 is planar, and a second state in which the specific region 230 of the display unit 151 is protruded.

Furthermore, hereinafter, the operation of the mobile terminal when the specific region is changed from either one of a planar state and a protruded state to the other has been described, but the present disclosure may not be necessarily limited to this. For example, the embodiments of the present disclosure may be implemented in such a manner that only the specific region is protruded, or a planar state and a protruded state is repeated within the specific region, or the specific region is deformed to a state of being protruded downward rather than being protruded upward.

Furthermore, the specific region may be in a first state in an initial phase, and at least one of a home screen page, a lock screen, screen information of a currently executed application may be displayed over the entire region of the display unit 151 including both the first region 210 (refer to FIG. 2B) and second region 220 (refer to FIG. 2B) disposed at both sides based on the specific region 230.

Figure 5:
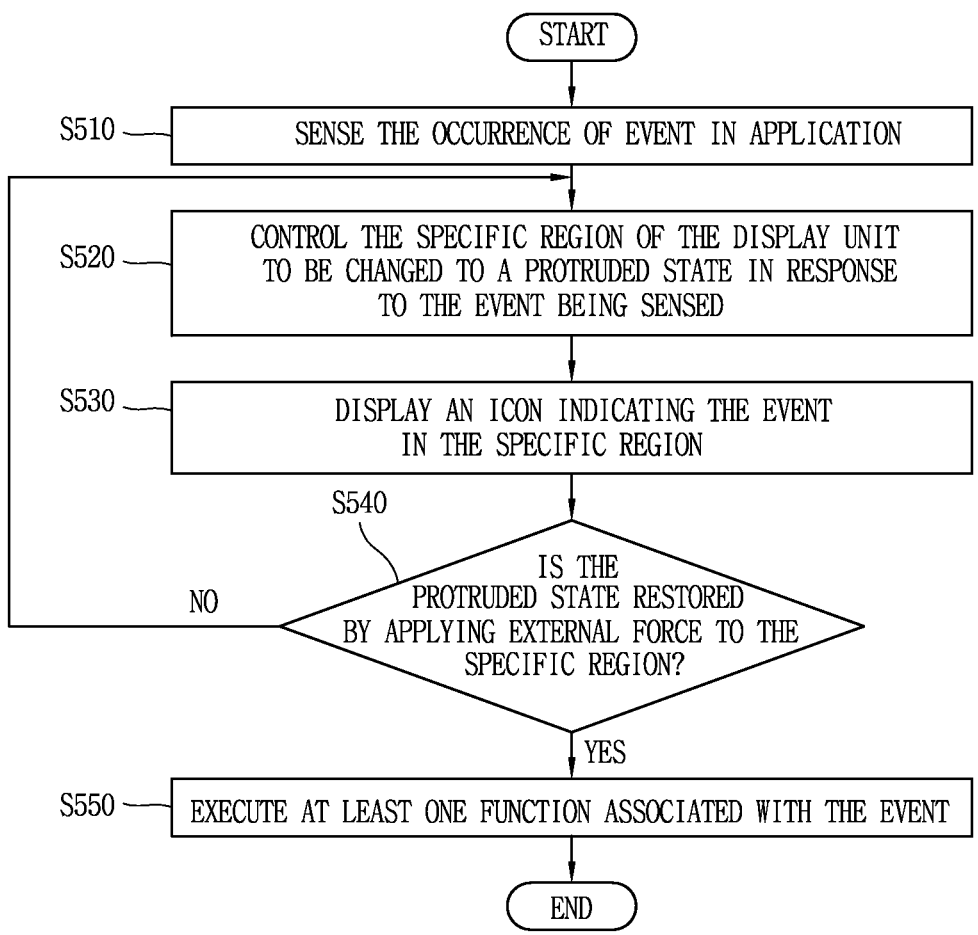
FIG. 5 is a representative flow chart for explaining a control operation of a mobile terminal according to an embodiment of the present disclosure.

Referring to FIG. 5, first, the controller 180 (refer to FIG. 1) of the mobile terminal 100 according to an embodiment of the present disclosure may sense an event occurring in at least one application installed in the mobile terminal 100 (S510).

Here, the "application" may be expressed as an "application program", and denotes every type of program that can be driven on the mobile terminal 100. For example, the application may be a program associated with a program for performing a function such as web browser, video play, schedule management, call, game, music, documentation, message, banking, e-book, traffic information, application update, and the like.

Furthermore, here, "event" denotes the occurrence of an event affecting the operation of at least one application installed in the mobile terminal 100 or the occurrence of an event of changing an item of database (or data file) associated with at least one application or the occurrence of an event of transmitting or sending data to an external terminal or external network through at least one application. For example, "call received", "message received" or the like may be an example of the event.

The controller 180 may control the specific region 230 of the display unit 151 (refer to FIG. 1) to be changed to a protruded state in response to the sensing of the event (S520).

At this time, the screen information of a home screen page or a currently executed application may be displayed on the display unit 151 as described above. Otherwise, according to another example, any screen information may not displayed while the flexible display unit 151 is in an inactive state.

On the other hand, the operation of a mobile terminal in which the state of the specific region 230 is changed from a first state to a second state when sensing an event will be described in brief below.

Specifically, when the occurrence of an event is sensed, the controller 180 may control to drive a pressure member formed to press at least part of the display unit 151, thereby applying a force to the specific region 230. At this time, the pressure member may be formed to change the shape due to a change of temperature, and formed of a shape memory alloy material that remembers and restores its shape at a specific temperature. For example, the pressure member may have a flat shape at a first temperature and a convex shape at a second temperature, thereby pressing the specific region 230 to be protruded. When a plurality of pressure members are implemented, the specific region 230 may be partitioned into a plurality of regions, and therefore, the controller 180 may individually control the shape of the plurality of regions.

The controller 180 may sense that the specific region 230 is changed from a first state to a second state through the sensing unit 140. To this end, the sensing unit 140 may sense a state of the specific region 230 and a relative position to the first region 210 or second region 220 using at least one of a proximity sensor, an IR sensor, a magnetic sensor and an illumination sensor. For another example, the mobile terminal 100 may include a bend sensor disposed on a front/rear surface or both surfaces of the flexible display unit 151 to sense the bending of the specific region 230, thereby calculating the extent of bending in the specific region 230 using the size of voltage/current applied to the bend sensor.

Furthermore, the controller 180 may sense the occurrence of a specific event to recognize that the specific region 230 has been changed from a first state to a second state. In this case, the sensing unit 140 is not required to sense that the specific region 230 has been changed from a first state to a second state. However, as will be described below in more detail, when the specific region 230 is changed to a second state according to the occurrence of an event, the controller 180 may sense the push of the specific region 230 or a force being applied in a direction perpendicular to the push direction through the sensing unit 140. Accordingly, the sensing unit 140 may sense restoration from a second state in which the specific region 230 is protruded to a first state in which the specific region 230 is flat.

Furthermore, the controller 180 may display an icon for notifying the event on the specific region 230 (S530). Here, information on the event may be briefly displayed along with an image representing an application corresponding to the event. For example, when the event is the reception of a message, part of the received message may be displayed on an icon. The icon may be displayed over the entire region of the specific region 230 or displayed to overlap with a screen that has been displayed in the specific region 230. Otherwise, the icon may be implemented as a dynamic image in which information displayed in a horizontally or vertically elongated manner and displayed within the icon is rotated to minimize the hiding of the screen that has been displayed in the specific region 230.

In this manner, when an event is notified in such a manner that the specific region 230 is changed from a flat state to a protruded state, the user may apply an external force or touch input to the specific region 230 to enter a control command associated with the processing of the event.

Specifically, as an external force is applied to the specific region 230, the sensing unit 140 (refer to FIG. 1) may sense that a protruded state of the specific region 230 is restored to a flat state again (S540).

Here, an external force applied to the specific region 230 may be carried out by a user or carried out by another object rather than the user (for example, stylus pen, etc.). Furthermore, the external force may include various types of touch inputs applied to the specific region 230, such as a tap, a drag, a flicking, a long/short press, a multi-touch, a pinch-in, a pinch-out touch input in addition to a simple push input.

Furthermore, the sensing unit 140 may sense the intensity, frequency and duration time of a push input/touch input corresponding to the external force, acceleration being restored from a protruded state to a flat state of the specific region 230 as the external force is applied thereto, and the like to provide it to the controller 180. Then, the controller 180 may sense the intensity, frequency and duration time of a push input/touch input applied to the specific region 230, and the restoring acceleration of the specific region 230 to control information displayed in the specific region 230 in a different manner.

Next, the controller 180 may execute at least one function associated with the occurred event in response to the specific region 230 being restored from a protruded state to a flat state again (S550).

For example, when the event is the reception of a message, the controller 180 may process that the received message is checked when the specific region 230 is restored from a second state to a first state as a push input is applied to the specific region 230.

At this time, the controller 180 may execute a different function according to the type the occurred event and a function set in connection with the event. For example, when the user applies a push input to the specific region 230 in a state that a call signal is received at the terminal and the specific region 230 is protruded upward, it is processed that the call connection has been rejected. In addition, for example, when the user applies a push input to the specific region 230 in a state that a message is received at the terminal and the specific region 230 is protruded upward, it is processed that the received message has been checked.

Furthermore, the controller 180 may perform the processing of the event in a different manner according to a time point at which a push input/touch input is applied to the specific region 230 or a time point at which the state of the specific region 230 is restored subsequent to the occurrence of the event. For example, it is processed that the call signal has been rejected when a push input is applied to the specific region 230 while receiving the call signal, and a missed call has been checked when a push input is applied to the specific region 230 in a state the call signal being received is not answered.

Furthermore, when a second state is restored to a first state as an external force is applied to the specific region 230 placed in the second state, the controller 180 controls an icon displayed in the specific region 230 to disappear, and screen information that has been hidden by the icon to reappear.

At this time, the controller 180 may control the disappearing speed of the icon displayed in the specific region 230 based on at least one of the intensity, frequency and duration time of a push input/touch input applied to the specific region 230, and the restoring acceleration of the specific region 230.

For example, when a push input above a reference value is applied to the specific region 230 to restore the state of the specific region 230, it may be controlled that an icon displayed in the specific region 230 immediately disappears. On the contrary, when a push input less than a reference value is applied to the specific region 230, it may be controlled that an icon displayed in the specific region 230 gradually disappears in proportion to the restored speed of the state of the specific region 230.

In this manner, when a second state is restored to a first state again as an external force is applied to the specific region 230, the controller 180 may control that a screen change corresponding to the execution of at least one function associated with the event is shown on the display unit 151.

For example, when a message is received and an external force is applied to the specific region 230 in a state that the specific region 230 is protruded and thus the specific region 230 is restored to a flat state again, a message received icon that has been displayed in an indicator region of the display unit 151 may disappear.

As described above, according to the embodiments of the present disclosure, the physical shape of a display unit, part of which can be bent or flexed, may be changed and notified during the occurrence of an event, thereby providing a new type of convenience and fun to the user.

Hereinafter, a specific embodiment in which an event is processed in a different manner according to the type of a push input/touch input applied to the specific region 230 will be described.

Figure 6A:
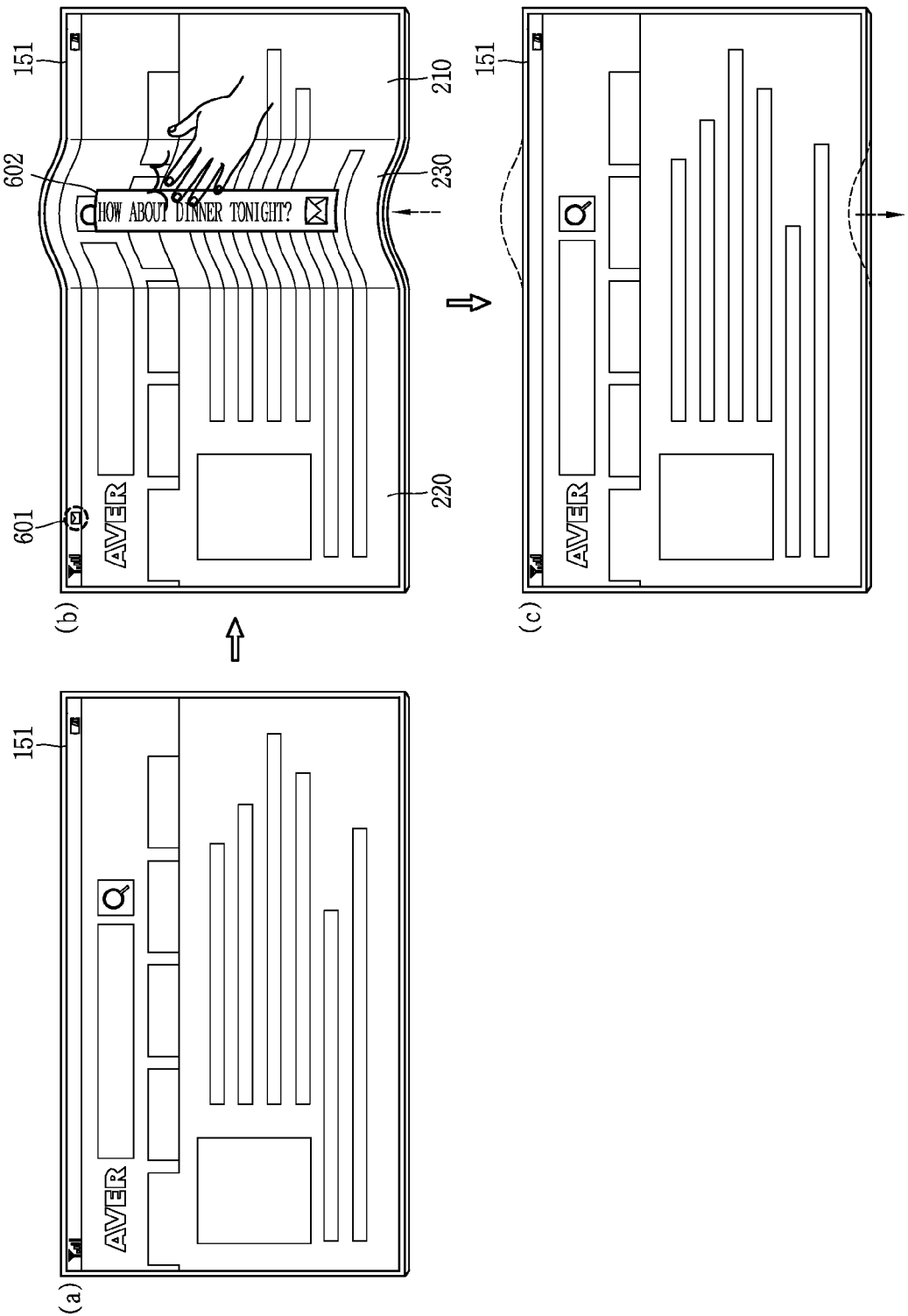
FIGS. 6A and 6B are exemplary conceptual views for explaining a method of deforming a specific region of the display unit to notify the occurrence of an event, and processing the event according to a touch input applied to the deformed specific region in a mobile terminal according to an embodiment of the present disclosure.
Figure 6B:
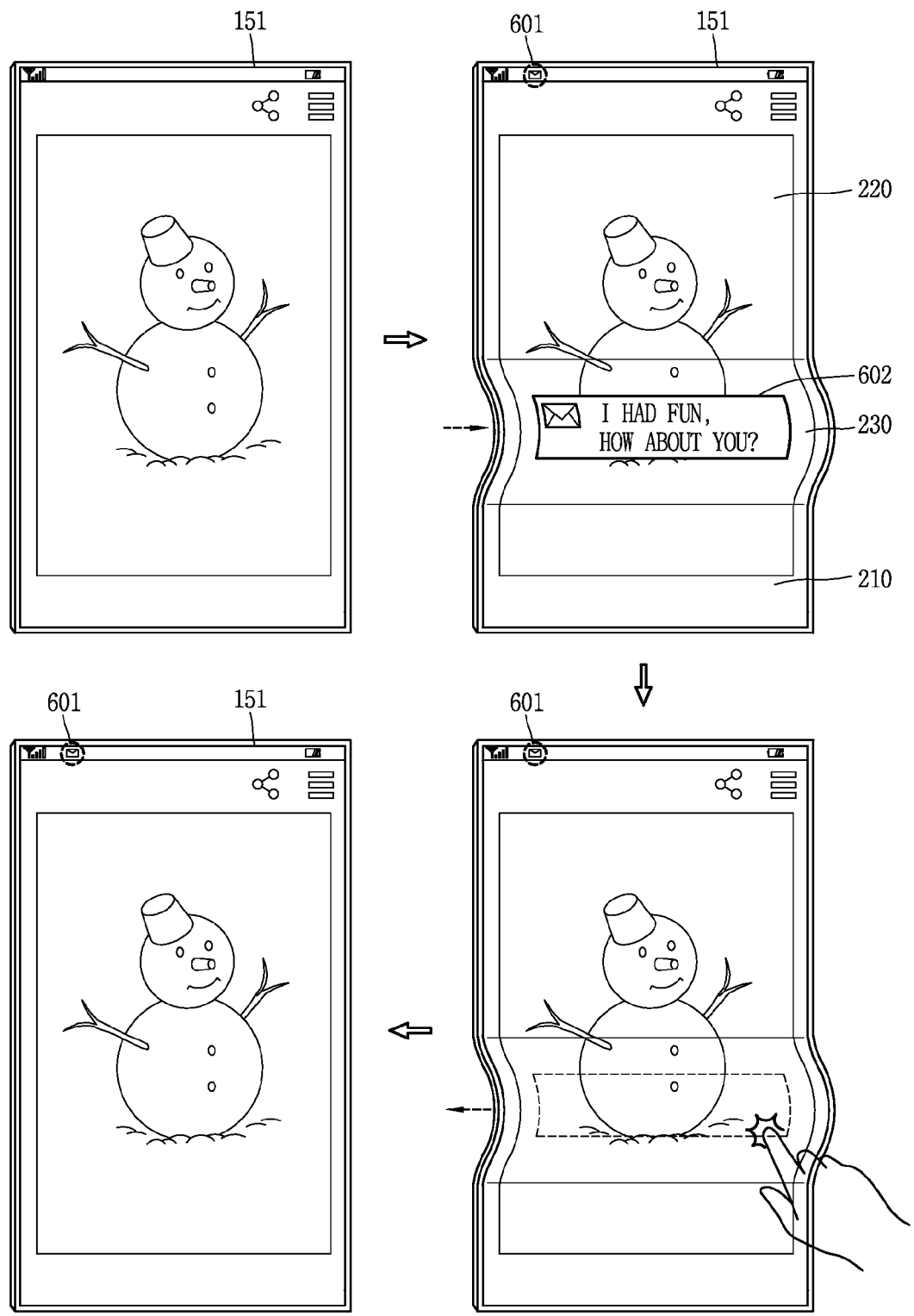

FIGS. 6A and 6B illustrate a method of processing an event in a different manner using a touch input applied to a protruded specific region. Specifically, FIG. 6A is a case where the event is processed by applying a push input above a reference value to the protruded specific region, and FIG. 6B is a case where an event is processed by applying a push input/touch input less than a reference value to the protruded specific region.

First, referring to FIG. 6A, an execution screen of a currently executed application, for example, a webpage screen, may be displayed over the entire region of the display unit 151. When a message is received in this state, the specific region 230 disposed between the first region 210 and the second region 220 is protruded upward. Furthermore, an icon 602 indicating the arrival of a message is displayed in the protruded specific region 230. At the same time, an indicator icon 601 indicating that a message has been received is displayed at an indicator region (an upper region of the display unit 151) indicating the operation state of the mobile terminal 100.

At this time, the protruded state of the specific region 230 may be continuously maintained while displaying the indicator icon 601. To this end, the mobile terminal 100 may continuously maintain a second temperature state of the foregoing pressure member or continuously supply a current/voltage to the bend sensor or maintain a protruded state of the specific region 230 for a predetermined period of time with a locking module (not shown) around the specific region 230.

In this state, when a second state of the specific region 230 is restored to a first state by an external force being applied to the specific region 230, namely, as the user strongly pushes or strikes down the specific region 230 with his or her hand as illustrated in FIG. 6A, the display of the indicator icon 601 that has been displayed in the indicator region disappears as illustrated in FIG. 6A. Then, the icon 602 that has been displayed in the specific region 230 may immediately disappear or display on the display unit 151 for a predetermined period of time.

Due to this, the mobile terminal 100 recognizes the received message as having been checked by the user. Accordingly, the reception of the message is not notified to the indicator region or notification bar.

On the other hand, the display unit 151 may be unfolded in a landscape view mode as illustrated in FIG. 6A or unfolded in a portrait view mode as illustrated in FIG. 6B. Information displayed on the display unit 151 is displayed in a horizontal direction in the landscape view mode, and displayed in a horizontal direction in the portrait view mode.

Referring to FIG. 6B, when a message is received in a state that a photo image corresponding to the execution of a gallery application is displayed on the display unit 151, the specific region 230 protrudes upward, and the icon 602 indicating the arrival of a message pops up from the specific region 230 as illustrated in FIG. 6B. Then, at the same time, an indicator icon 601 indicating that a message has been received is displayed at an indicator region (an upper region of the display unit 151) indicating the operation state of the mobile terminal 100.

In this state, when the user slowly pushes, continuously knocks or applies a short touch to the specific region 230 with his or her hand as illustrated in FIG. 6B, the display of the indicator icon 601 is continuously maintained as illustrated in FIG. 6B(d).

Furthermore, the second state of the specific region 230 is gradually or after a predetermined period of time restored to the first state. The icon 602 that has been displayed in the specific region 230 disappears after being displayed for a predetermined period of time. At this time, a duration time of the display of the icon 602 may be inversely proportional to a push input/touch input applied to the specific region 230 or proportional to a duration time of the touch input.

According to this, the mobile terminal 100 no longer displays the received message but recognizes the message as not being checked by the user. Accordingly, the notification of receiving a message is maintained in the indicator region or notification bar of the display unit 151.

In this case, when another event occurs, the controller 180 may allow the restored specific region 230 to be protruded upward again. Then, an icon indicating the another event is displayed in the protruded specific region 230. At this time, the previous event information that has been processed as not being checked by the user in FIG. 6B may be checked at the same time using a touch input to the displayed icon.

Specifically, when the specific region 230 is changed from the first state to the second state again within a predetermined period of time in a state that the event is processed as being unchecked, the controller 180 may update information displayed on the icon using a touch input consecutively applied to the specific region 230 with a predetermined time interval.

For example, when the information of an event occurred later is displayed on an icon displayed in the specific region 230, and then a touch input consecutively applied with a predetermined time interval is applied to the specific region 230, the information of the previously occurred event is displayed. Accordingly, the user can view a plurality of unchecked events at once. Then, the user strongly pushes or strikes down the specific region 230 with his or her hand to restore the specific region 230 from the second state to the first state, it is processed that the plurality of events have been checked at once.

On the other hand, though not shown in the drawing, when the touch is maintained even after the second state of the specific region 230 is gradually restored to the first state as the user applies a touch to the specific region 230 using his or her finger, the controller 180 may execute an application corresponding to the icon 601, and accordingly, a message conversation screen may be displayed on the entire screen of the display unit 151.

As described above, according to an embodiment of the present disclosure, an event may be processed in a different manner using a push input applied to the deformed specific region, thereby providing a new form of input environment.

Hereinafter, a method of entering an edit mode using a drag input to the deformed specific region will be described in detail with reference to FIGS. 7A and 7B(a) and 7B(b).

When a touch input is applied to the icon 602 while the icon 602 indicating an event is still displayed after the second state of the specific region 230 is restored to the first state in the foregoing FIGS. 6A and 6B, a response message for the received message may be prepared while the screen is switched to the execution screen of an application corresponding to the relevant icon. In this case, there is inconvenience in which screen information that has been displayed on the display unit 151 prior to the occurrence of the event disappears.

Figure 7A:
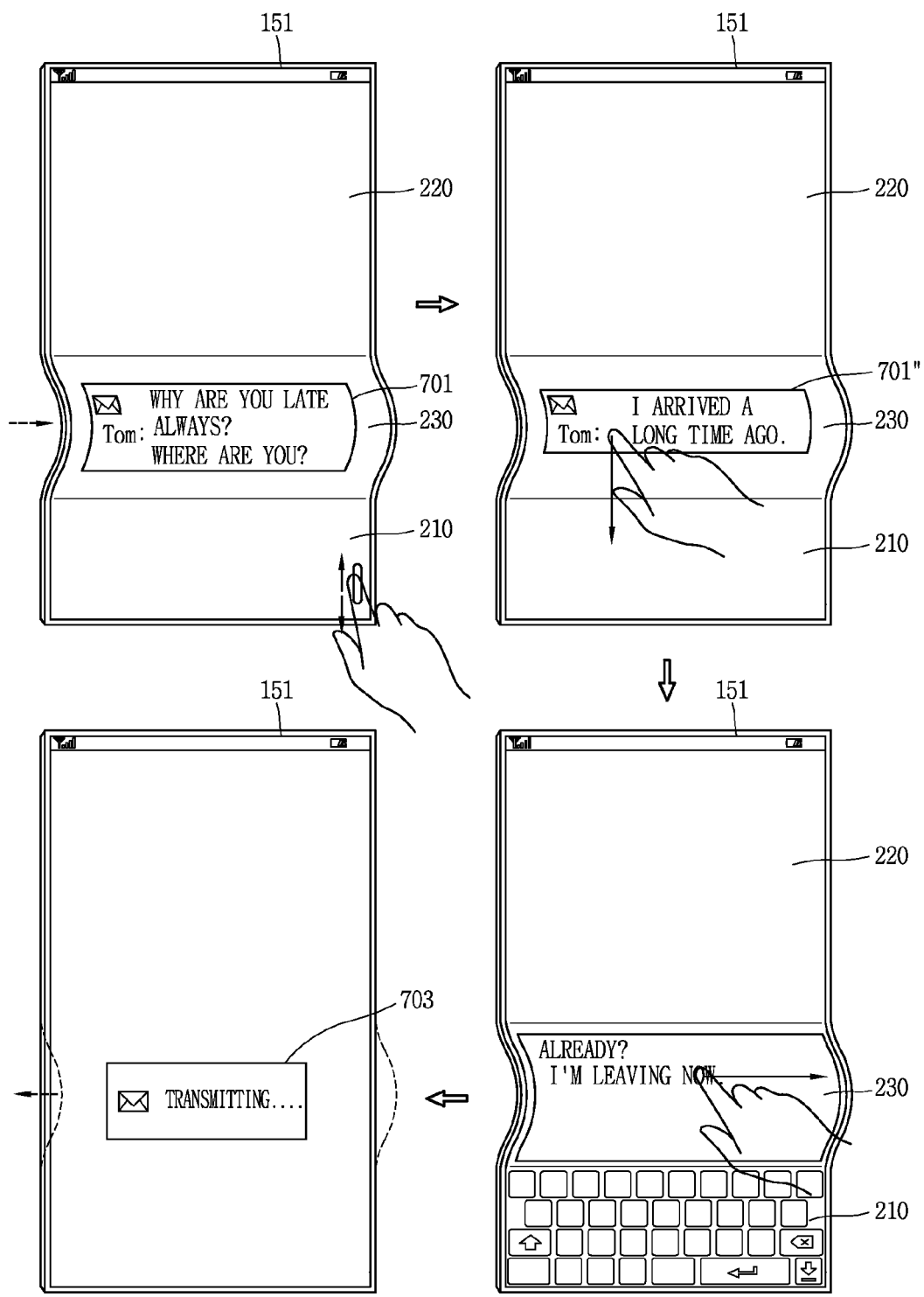
FIGS. 7A,7B(a) and 7B(b) are exemplary conceptual views for explaining a method of applying a drag input to the deformed specific region to operate an edit mode in a mobile terminal according to an embodiment of the present disclosure.

FIG. 7A illustrates an example in which the user enters an edit mode using a touch input to the specific region 230 while maintaining the display of screen information that has been displayed on the display unit 151 prior to the occurrence of an event to write a response message to the received message.

First, referring to FIG. 7A, when specific screen information (for example, a lock screen, a home screen page, an execution screen of a currently executed application) is displayed on the display unit 151 or a message is received in a state that the display unit 151 is off, an icon 701 indicating the reception of the message is displayed in the specific region 230 while the specific region 230 of the display unit 151 is protruded upward.

On the other hand, information displayed on the icon 701 may be checked using a scroll function in a state that the specific region 230 is protruded. At this time, as the specific region 230 is protruded upward, it is difficult to apply a touch input to the icon 701 to perform scroll, and also has low visibility.

Consequently, when an icon indicating an event is displayed in the specific region 230, the controller 180 may move information displayed on the icon in a vertical or horizontal direction using a touch input applied to at least one region of the first region 210 and the second region 220 while maintaining the second state of the specific region 230.

For example, the right region of the first region 210 is scrolled in a vertical direction in FIG. 7A, the message content of an icon 701 displayed in the specific region 230 is scrolled in a vertical direction. At this time, when the first region 210 has been an inactive state, it is switched to an active state at a time point at which an initial touch is applied to the first region 210, and a touch sensor of the first region 210 is activated. Then, though not shown in the drawing, a scroll bar (not shown) for moving information in a vertical direction may be shown in the right region of the first region 210.

Furthermore, as illustrated in FIG. 7A), a drag input extended from the specific region 230 to the first region 210 (or second region) is applied to the icon 701, the controller 180 enters an edit mode to display an input window associated with the processing of an event corresponding to the icon 701 in the first region 210 (or second region). At this time, the protruded state of the specific region 230 is maintained and thus placed in the state of receiving a next control command.

The input window displayed in the first region 210 from which the drag input is released may be a virtual keyboard as illustrated in FIG. 7A. The user may write a response message to the received message using the displayed input window, namely, a virtual keyboard. The written message is displayed in real time in the specific region 230. The protruded state of the specific region 230 is maintained while writing the response message.

When the specific region 230 is restored from the second state to the first state as an external force is applied to the protruded specific region 230 subsequent to the completion of the writing of the response message, the response message written at a time point at which the specific region 230 is restored to the first state is transmitted to the other terminal. In other words, a message transmission function is carried out as the specific region 230 is restored from the second state to the first state.

Furthermore, as illustrated in FIG. 7A, an icon indicating a message being transmitted is displayed while transmitting the message, and an input window that has been displayed in the first region 210, namely, a virtual keyboard, disappears. At this time, during the process of FIG. 7A, screen information that has been displayed prior to the occurrence of an event is continuously displayed or an inactive state is continuously maintained.

Figure 7B:
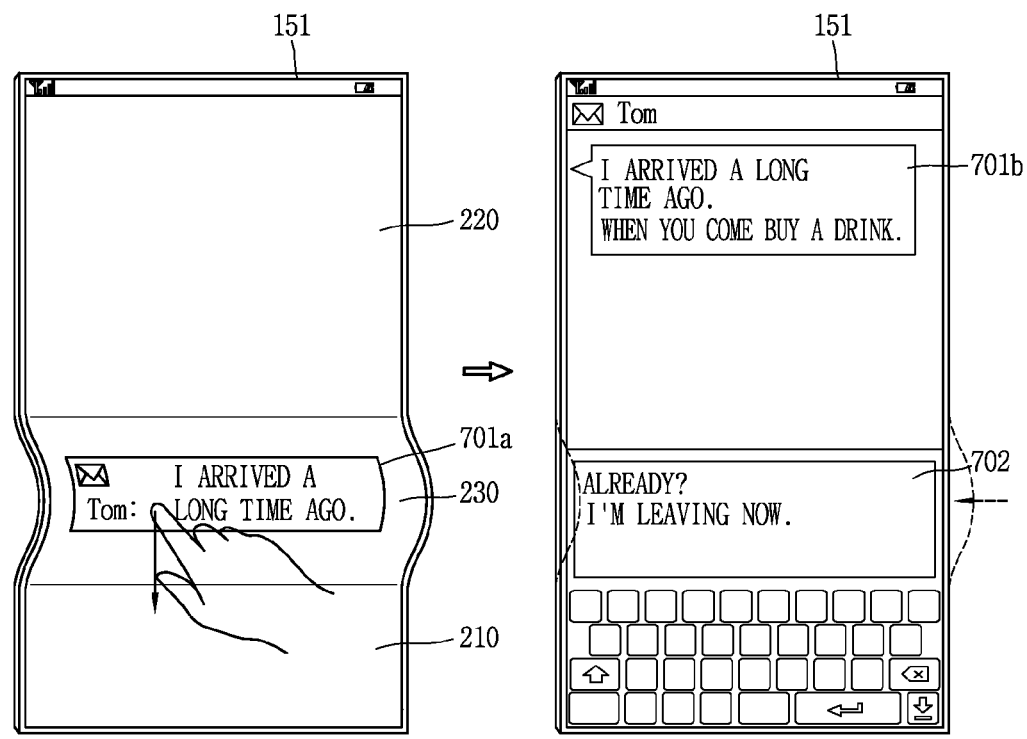
Figure 7B:
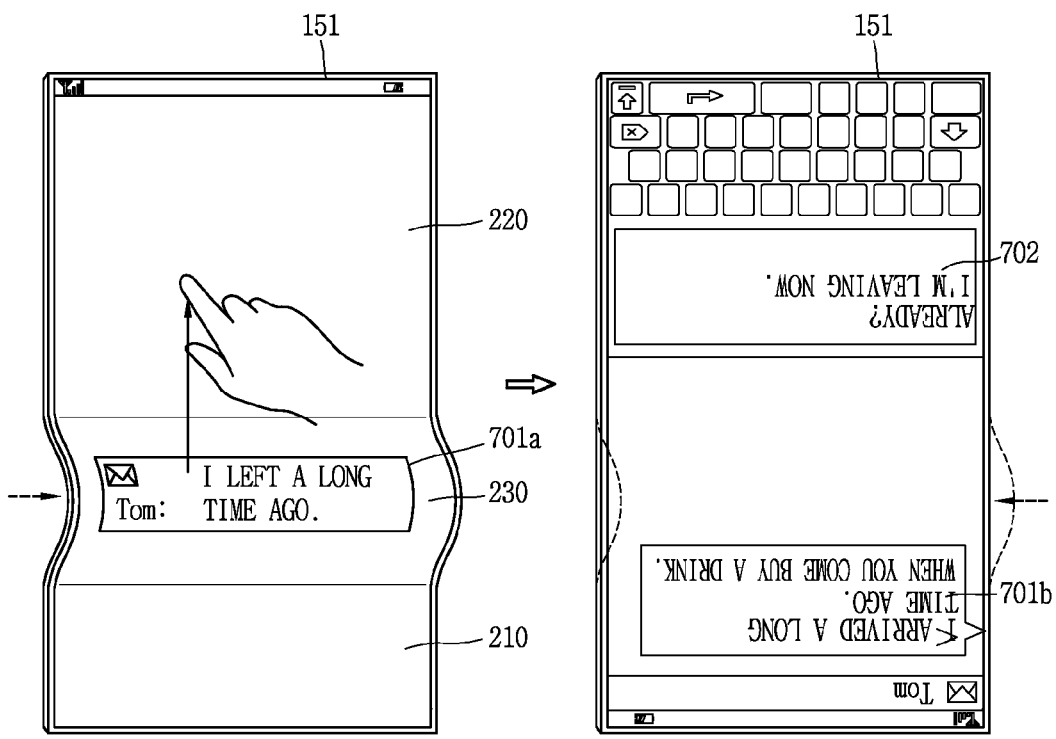

FIGS. 7B(a) and 7B(b) illustrates a method of determining the display direction of a screen corresponding to the foregoing edit mode based on a touch input applied to the specific region 230.

The controller 180 determines the display direction of the foregoing input window based on the drag direction of a drag input started from the protruded specific region 230. Specifically, when a drag input started from the specific region 230 is released from the first region 210 as illustrated in FIG. 7B(a), the display direction of the screen is determined by recognizing the user direction as a downward direction of the first region 210. Meanwhile, when a drag input started from the specific region 230 is released from the second region 220, the display direction of the screen is determined by recognizing the user direction as a upward direction of the second region 220.

On the other hand, when the second state of the specific region 230 is restored to the first state by the drag input, the controller 180 may display detailed information associated with the event in the other one of the first and the second region.

Specifically, when a drag input started from the specific region 230 is released from the end of the first region 210 while restoring the state of the specific region 230 in a state that an icon 701a indicating the reception of a message is displayed in the specific region 230 as illustrated in FIG. 7B(a), a virtual keyboard is displayed in the first region 210, and detailed information (for example, a message conversation screen 701b) associated with an event corresponding to the icon 701a is displayed in the second region 220 by recognizing a lower side of the first region 210 as a user direction.

As illustrated in FIG. 7B(b), when a drag input started from the specific region 230 is released from the end of the second region 220 while restoring the state of the specific region 230 as illustrated in FIG. 7B(b), a virtual keyboard is displayed in the second region 220, and detailed information (for example, a message conversation screen 701b) associated with an event corresponding to the icon 701a is displayed in the first region 210 by recognizing an upper side of the second region 220 as a user direction.

On the other hand, the display direction of information may be determined based on a region from which a drag input started from the specific region 230 is released, but whether the user's hand position is currently at a lower side of the first region 210 or an upper side of the second region 220 may be recognized using a proximity sensor provided in the first region 210 and the second region 220.

Furthermore, as described above, an icon displayed in the protruded specific region 230 may be displayed over the entire specific region 230, but may be also displayed in such a manner that the specific region 230 overlaps with part of the screen that has been displayed at first. In this case, the specific region 230 may include a first portion in which the icon is displayed and a second portion in which screen information that has been displayed in the first state is displayed.

At this time, when a touch input is sensed to the specific region 230 while maintaining the second state of the specific region 230, the controller 180 may limit an input of a control command to the second portion. It is to recognize it as a control command associated with an icon even when the drag input is started from the second portion in consideration of the protruded characteristic of the specific region 230.

As described above, notifications to various events are all the same, namely, though notifications by changing the specific region from a first state to a second state when an event occurs are all the same, their executed control commands vary according to a push input/touch input applied to the protruded specific region according to the type or number of events. There is a limit for the user to memorize all the information.

Figure 7C:
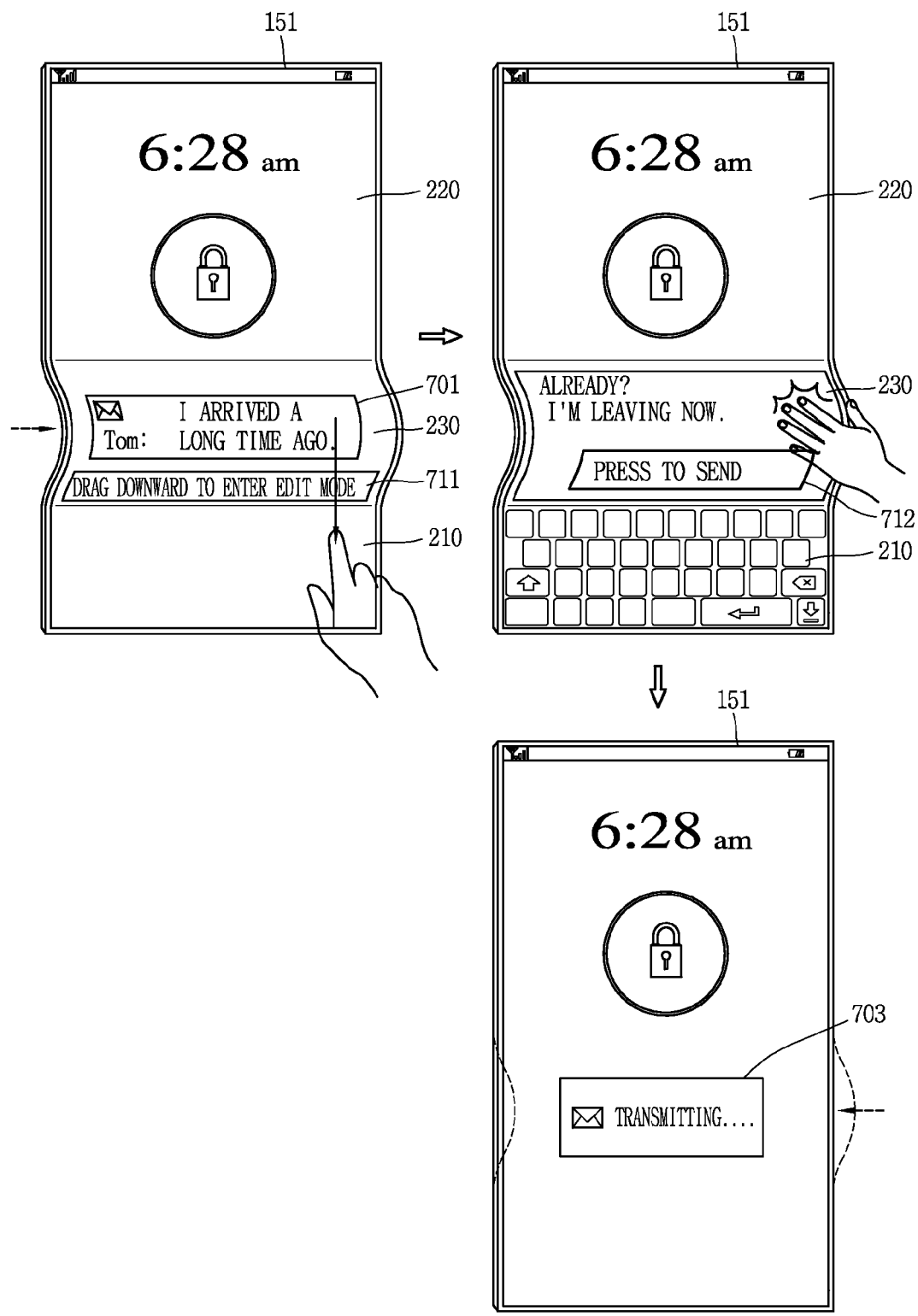
FIG. 7C is a conceptual view for explaining a method of guiding various executable functions using the deformed specific region in a mobile terminal according to an embodiment of the present disclosure.

Consequently, FIG. 7C illustrates an example of a method of providing information associated with various executable functions using a deformed specific region.

Specifically, when the specific region 230 is changed from a first state to a second state as an event occurs from at least one application, the controller 180 may display guide information for notifying an executable function by applying an external force to the specific region.

For example, referring to FIG. 7C, when a message is received in a state that a lock screen corresponding to the lock state of the mobile terminal 100 is displayed on the flexible display unit 151, the specific region 230 of the flexible display unit 151 is protruded upward to notify the reception of a message.

At this time, a first indicator icon 711 for guiding a method of entering an edit mode along with an icon 701 in which the content of the received message is briefly displayed may be displayed in the protruded specific region 230. A message such as "Drag downward to enter edit mode" or an arrow image may be displayed on the first indicator icon 711.

When a drag input started from the specific region 230 is released according to information displayed on the first indicator icon 711, a screen for writing a response message is displayed as illustrated in FIG. 7C. Specifically, a virtual keyboard is displayed in the first region 210 from which the drag input is released, and a written response message is displayed in the protruded specific region 230. At this time, a second indicator icon 712 for guiding a method of transmitting the written message in addition to the response message is displayed in the protruded specific region 230. For example, a message such as "Press to send" or an image of striking down his or her palm may be displayed.

When the specific region 230 is restored to the first state by strongly pushing or striking down the specific region 230 according to information displayed on the second indicator icon 712, the written message is transmitted and an icon 703 for notifying the message being transmitted while transmitting the message is displayed as illustrated in FIG. 7C. When the transmission of the message is completed, a lock screen corresponding to the lock state of the mobile terminal is displayed over the entire region of the display unit 151.

Figure 8A:
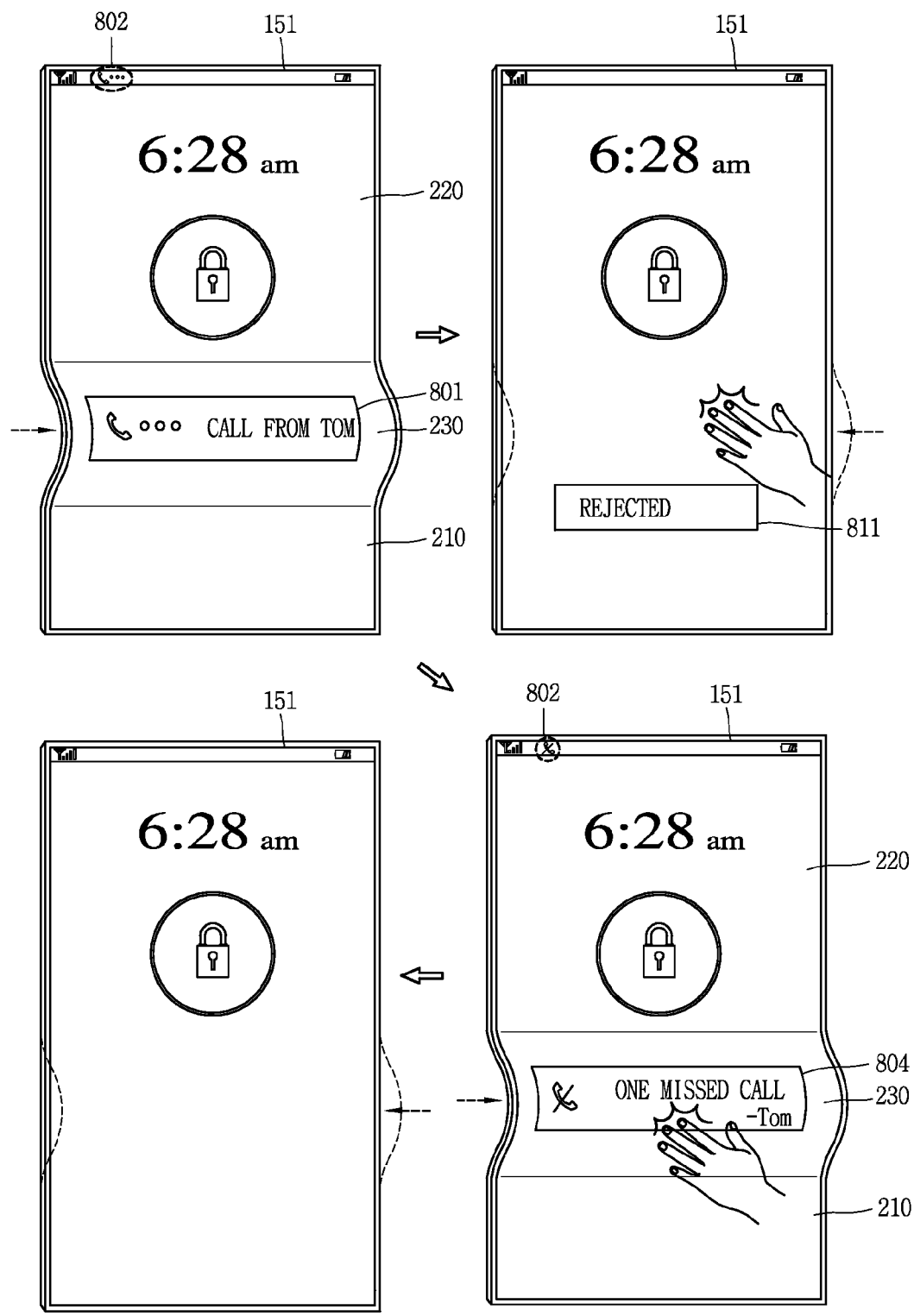
Figure 8B:
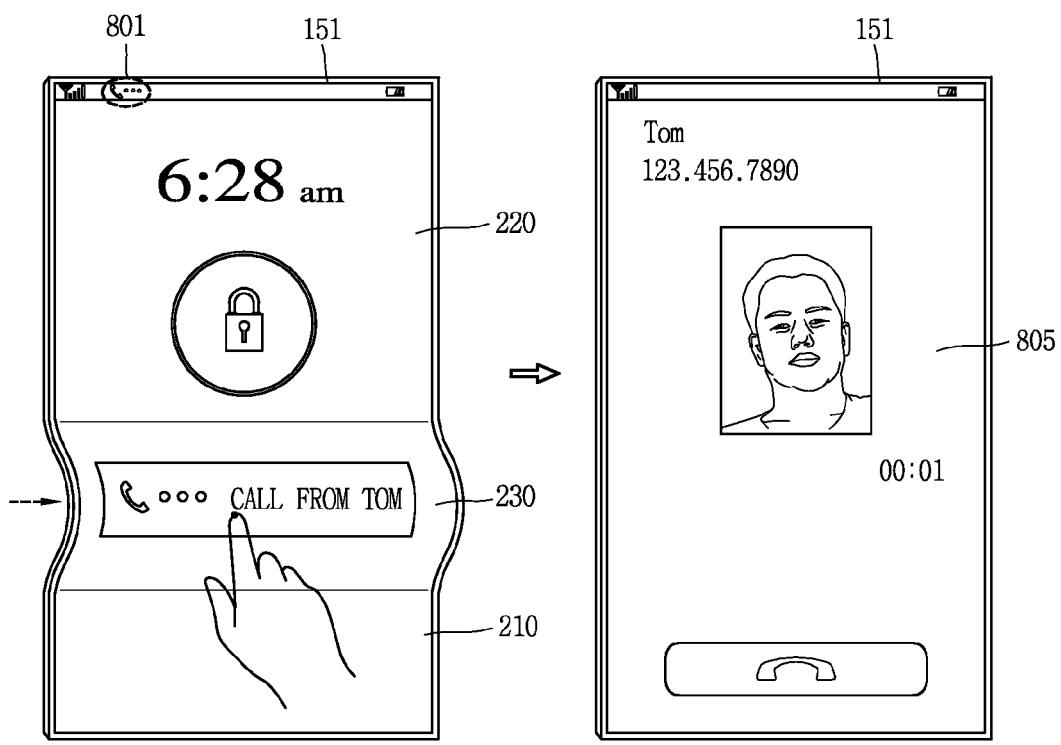

FIGS. 8A through 8C illustrate various methods for processing a call signal using a touch input to the deformed specific region in a mobile terminal according to an embodiment of the present disclosure.

First, referring to FIG. 8A, when a call signal is received through the communication unit 110, the controller 180 of the mobile terminal 100 controls the mobile terminal 100 to change a first state in which the specific region 230 is flat to a second state in which the specific region 230 is protruded. At this time, an indicator 801 indicating that a call signal is received is displayed in the protruded specific region 230. information on the counterpart who has transmitted the call signal and his or her phone number are displayed on the indicator 801.

When the second state is restored to the first state by applying an external force to the specific region 230 while displaying the indicator 801 in the specific region 230 as described above, the controller 180 rejects the call connection. Accordingly, a notification icon 811 for notifying that the call connection has been rejected displays for a predetermined period of time and then disappears on the display unit 151 as illustrated in FIG. 8A.

On the other hand, when any input is not applied to the mobile terminal 100 while displaying the indicator 801, the received call signal is processed as an unanswered call signal. Accordingly, an icon 804 for notifying that the call signal has been unanswered is displayed in the protruded specific region 230 as illustrated in FIG. 8A. The number information of unanswered call signals is displayed on the icon 804.

When the second state is restored to the first state by applying an external force to the specific region 230 while displaying the icon 804 in the specific region 230 as described above, the controller 180 processes that the unanswered call signal has been checked. As a result, as illustrated in FIG. 8A, the display of the icon 804 disappears, and a missed call notification icon 803 that has been displayed in an indicator region (upper end region) of the display unit 151 is no longer displayed.

On the other hand, when a first touch input is applied to the indicator while displaying the indicator for notifying that a call signal has been received in the protruded specific region, the controller 180 may connect the call signal, and display screen information for transmitting a reject message to the call signal in the specific region 230 when a second touch input is applied to the indicator.

Specifically, in order to connect a call in a state that the specific region 230 of the display unit 151 is changed from the first state to the second state as the call signal is received, the user applies a short or long touch to an indicator for notifying the reception of the call signal displayed in the protruded specific region 230 as illustrated in FIG. 8B or bring the mobile terminal 100 close to his or her ear, the call connection is processed while the specific region 230 is restored to the first state. As a result, as illustrated in FIG. 8B, a call screen is displayed over the entire region of the display unit 151. When a call is connected by a touch to the indicator displayed in the specific region 230, a speaker function is automatically activated.

FIG. 8C illustrates an example of a method of transmitting a reject message to the received call signal using a touch input to the protruded specific region 230.

For example, when an indicator for notifying the reception of a call signal displayed in the protruded specific region 230 is dragged in one direction (from the left to the right or from the right to the left) or a flicking touch input is applied thereto in one direction as illustrated in FIG. 8C, transmittable reject messages 806 are popped up in the specific region 230 as illustrated in FIG. 8C.

When only part of transmittable reject messages are displayed in the specific region 230, a drag input may be applied to the first region 210 to vertically scroll information displayed in the specific region 230. When a push input/touch input is applied to any one 806d (for example, I'll call you right back) of the displayed reject messages 806 as illustrated in FIG. 8C, the selected message 806d is transmitted to the other terminal while the specific region 230 is restored to the first state.

Hereinafter, a method of processing an event using another type of input applied to the protruded specific region will be described with reference to FIGS. 9A and 9B.

Specifically, the controller 180 of the mobile terminal 100 may sense a force in a direction perpendicular to a direction of pushing the upward protruded specific region 230 through the sensing unit 140. To this end, the sensing unit 140 of the mobile terminal 100 may sense an input for pinching or squeezing the protruded specific region 230. To this end, the sensing unit 140 may sense a user's pinching motion using an IR sensor provided therein or sense a user's squeezing input to the specific region 230 using a squeeze sensor provided in the specific region 230. In this manner, when an input for pinching or squeezing the protruded specific region 230 is carried out, at least part of the specific region 230 is further protruded upward for a predetermined period of time and then returned to a previous protruded state or restored to a flat state.

Figure 9A:
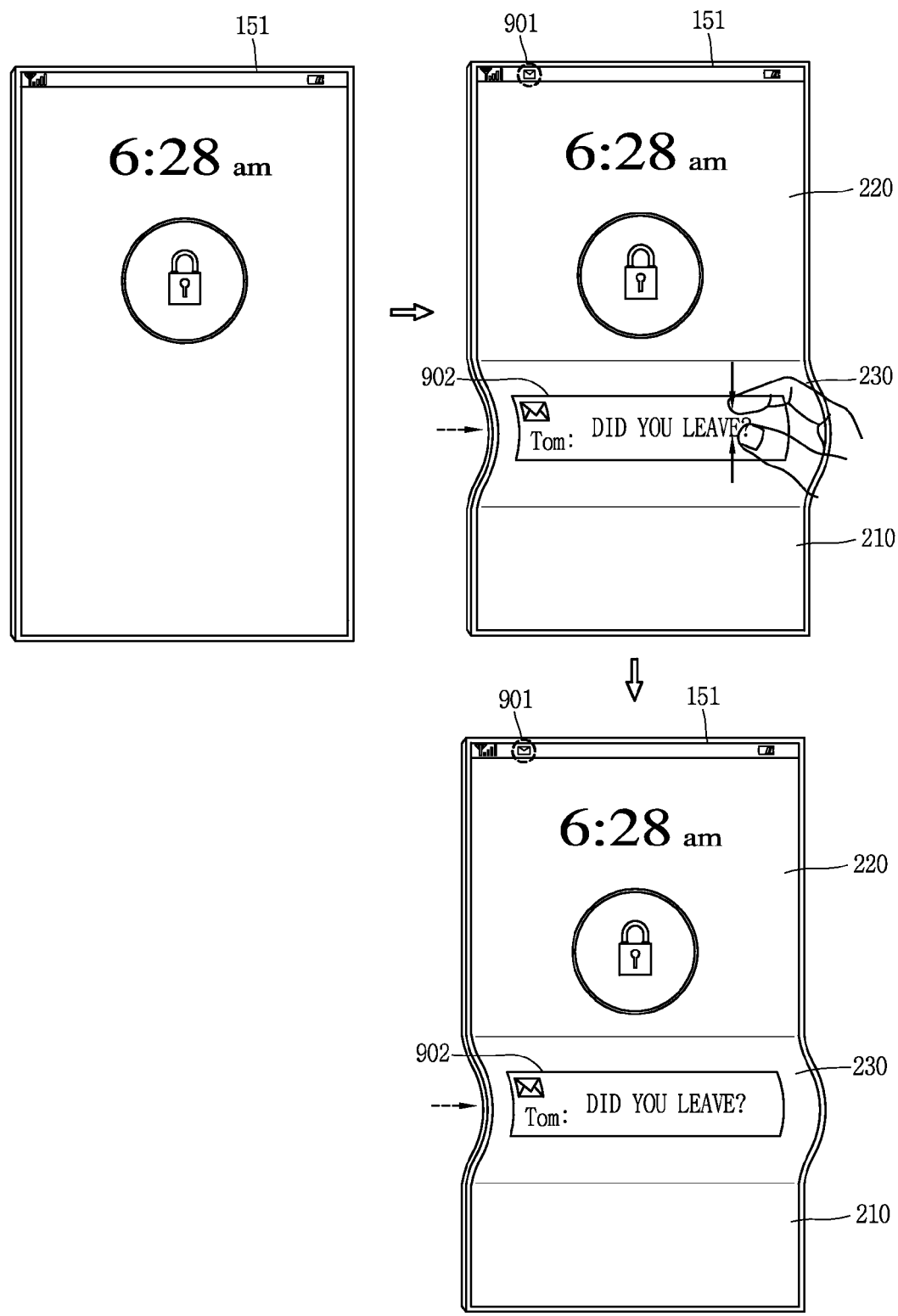
FIG. 9A is a conceptual view for explaining a method of pressing the deformed specific region to be further protruded to set the re-notification of an event in a mobile terminal according to an embodiment of the present disclosure.

FIG. 9A illustrates a method of applying a force perpendicular to a direction of pushing the specific region to further protrude the deformed specific region to set the re-notification of an event When a plurality of touch positions applied to one surface and the other surface formed based on a protruded portion of the specific region 230 are pressed in directions of being closer to each other while maintaining the second state of the specific region 230, namely, when an input for pinching or squeezing the protruded specific region 230 is sensed, the controller 180 maintains the second state of the specific region 230 for a predetermined period of time or further protrudes the second state of the specific region 230 in a direction perpendicular to a direction of pushing a force and then restores it to the first state again. The controller 180 controls an icon for notifying an event with a predetermined interval to be displayed in the specific region 230 again, and the state of the specific region 230 to be changed to the second state again. In other words, a snooze function for event notification is carried out.

At this time, the controller 180 may set the predetermined time interval such that a plurality of touch positions applied to one surface and the other surface of the protruded specific region 230 are proportional to at least one of the pressed level and number of times thereof.

For example, when the user slightly pinches the specific region 230 as illustrated in FIG. 9A in a state that the specific region 230 of the display unit 151 is protruded as a message is received as illustrated in FIG. 9A, the next alarm time of an event is determined in proportion to the pressed level or pinched level of a plurality of touch inputs applied to one surface and the other surface of the protruded specific region 230. For example, as the protruded specific region 230 is more pinched, an interval of the next alarm time of the event is further separated. Furthermore, subsequent to a predetermined period of time (for example, within several seconds), the protruded specific region 230 becomes flat again. Reaching the determined next alarm time (for example, 3 minutes), an icon for notifying an event is displayed again in the specific region 230 while the specific region 230 is protruded upward again as illustrated in FIG. 9A.

In addition, though not shown in the drawing, as increasing the pressed number of times of a plurality of touch positions applied to one surface and the other surface of the protruded specific region 230, an interval of the next alarm time of the event may be further separated (for example, alarm after 3 minutes->alarm after 5 minutes->alarm after 30 minutes).

For another example, when the user slightly pinches the protruded specific region 230, a locking module (not shown) provided around the specific region 230 may be operated to maintain the second state of at least part of the specific region 230 for a predetermined period of time. Then, when the specific region 230 is restored to the first state after the predetermined period of time has passed, the mobile terminal may wait for a time consumed for restoring the specific region 230 from the second state to the first state to implement the execution of re-alarm of the event when reaching the relevant time. In other words, a time that has passed to restore the specific region 230 from the second state to the first state from a time point at which the user pinches the protruded specific region 230 corresponds to an interval of the next event alarm time.

Figure 9B:
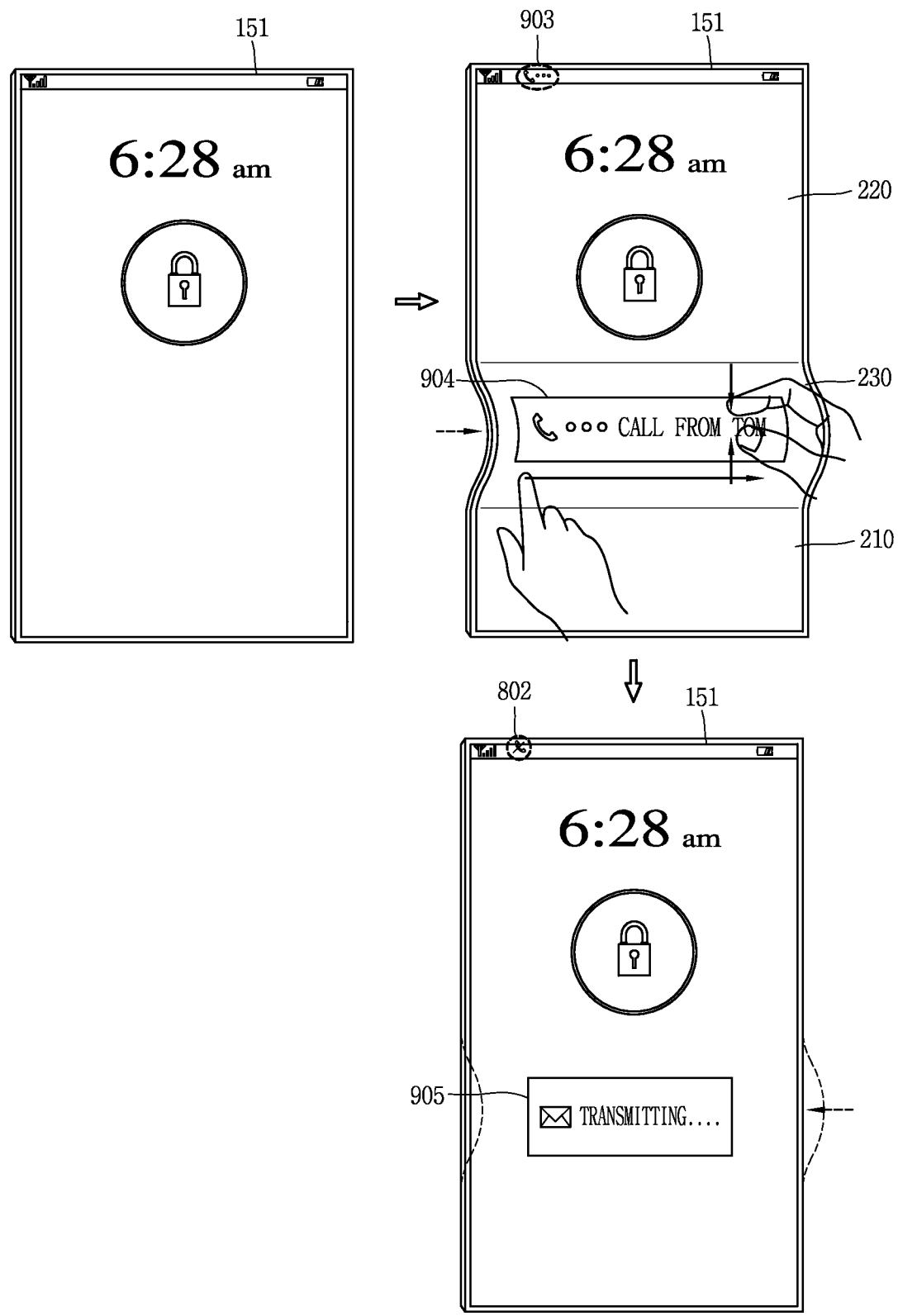
FIG. 9B is an exemplary conceptual view for explaining a method of consecutively applying touch inputs in a state that the deformed specific region is pressed to be further protruded to process a plurality of functions at the same time in a mobile terminal according to an embodiment of the present disclosure.

FIG. 9B illustrates an example of applying a touch input in a state that the deformed specific region is further protruded in a pinched or squeezed manner to process a plurality of function associated with the event at once.

To this end, the controller 180 may sense a touch input being applied to an icon displayed in the specific region 230 in a state that a pressure is maintained for a plurality of touch positions applied to one surface and the other surface of the protruded specific region 230, namely, in a state that the protruded specific region 230 is pinched or squeezed.

In this case, a first function associated with the event and a second function associated with the first function may be sequentially carried out. For example, when a drag input is applied to an icon displayed in the specific region 230 in one direction in a state that the specific region 230 is slightly pinched as illustrated in FIG. 9B in case where the specific region 230 of the display unit 151 is protruded upward upon receiving a call signal as illustrated in FIG. 9B, the call connection is rejected and a reject message (for example, a message indicated by the user or the most frequently transmitted message) is concurrently or subsequently transmitted as illustrated in FIG. 9B. Meanwhile, an unanswered call signal is recognized as an unchecked state to continuously display an icon 802 indicating a missed call in the indicator region.

On the other hand, though not shown in the drawing, when a call signal is received through the communication unit 110 while the entire display unit 151 of the mobile terminal 100 is in an inactive state, only the specific region 230 may be switched to an active state, and the first region 210 and second region 220 may maintain an inactive state. In this case, the controller 180 may change the specific region 230 that has been switched to an active state from the first state to the second state, and display an indicator indicating that a call signal has been received only in the specific region 230.

In the above, various examples of changing a physical shape of the display unit to notify the occurrence of an event and processing the event in various ways using a push input pressed to the deformed specific region have been described.

Hereinafter, various operations implemented by a mobile terminal according to another embodiment of the present disclosure will be described with reference to FIGS. 10(a) to 10(c), 11A(a) to 11A(c), 11B(a) and 11B(b), 11C and 11D(a) to 11D(c).

Figure 10A:
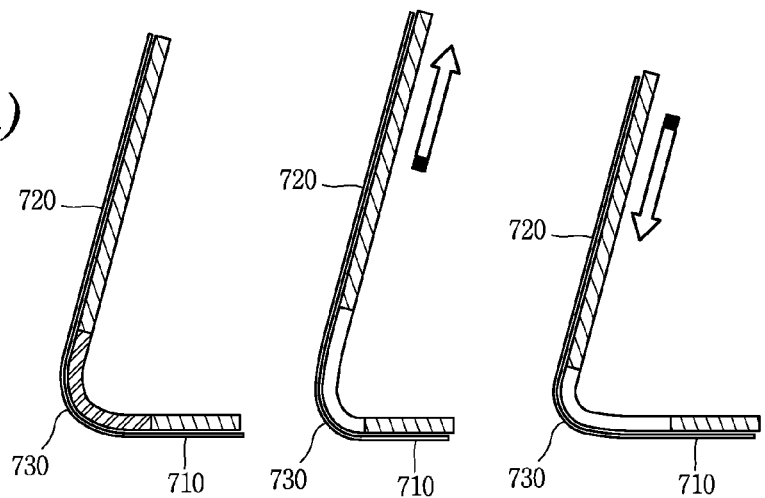
FIGS. 10($a$) to 10($c$) are conceptual views illustrating various operations implemented by a mobile terminal according to another embodiment of the present disclosure.
Figure 10B:
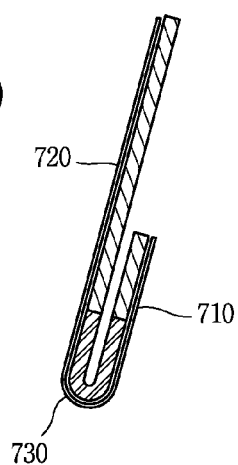
Figure 10C:
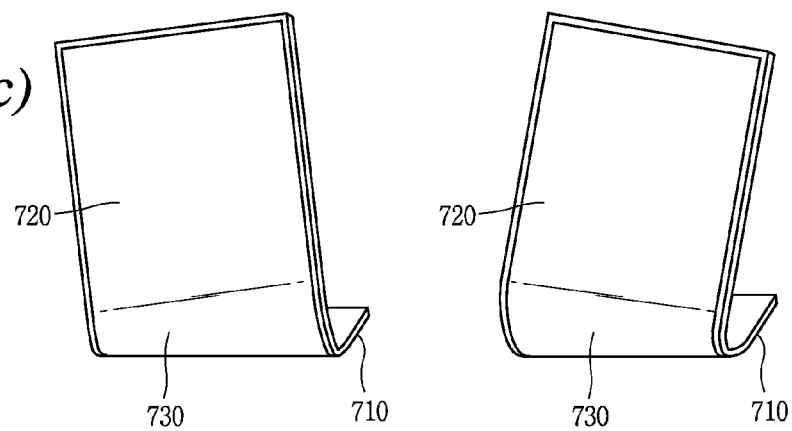

First, FIGS. 10(a) to 10(c) are conceptual views illustrating various operations implemented by a mobile terminal according to another embodiment of the present disclosure.

Referring to FIGS. 10(a) to 10(c), the specific region is a foldable region, and may be bent based on a plurality of positions. For example, as illustrated in FIG. 10(a), the specific region may be bent based on a plurality of positions, and thus the height of the second region 720 may be set in various ways. Furthermore, the specific region 730 may be completely folded as illustrated in FIG. 10(b).

For another example, as illustrated in FIG. 10(c), locations bent at both sides of the specific region 730 may vary. Due to this, the second region 720 may be erupted and then tilted to the left or right. The foregoing various operations may be implemented by a locking module 790. The locking module 790 has a hinge structure to which the same shape is repeatedly coupled, and disposed inside the cover to perform a function of supporting a flexible shape change of the supporting member.

Hereinafter, various examples of pulling, pushing the deformed specific region or tilting it to the left or right to enter a different control command in a mobile terminal according to still another embodiment of the present disclosure will be described with reference to FIGS. 11A(a) to 11A(c), 11B(a) and 11B(b), 11C and 11D(a) to 11D(c).

For the purpose of this, as the specific region 730 of the display unit 151 is placed in the second state, the mobile terminal 100 may be used in a state that either one of the first region 710 and the second region 720 provided based on the specific region 730 may be placed on the bottom surface, and the other one may be erected based on the specific region 730.

In this state, the sensing unit 140 of the mobile terminal 100 may sense an various types of external forces applied to the display region (for example, second region 720) placed in an erected state based on the specific region 730 to sense a change to a third state in which the state of at least part of the specific region 730 placed in the second state varies. Furthermore, the sensing unit 140 may sense restoration from the third state to the second state after a predetermined period of time has passed.

Specifically, the third state denotes a state in which at least part of the specific region 730 placed in the second state is bent, flexed, unfolded or stretched in a direction to which a force is applied. In other words, the third state denotes a state in which the bent specific region 730 is stretched, flexed or bent in a horizontal direction as pulling the second region 720 placed in an erected state upward, pushing the second region 720 downward or tilting the second region 720 to the left or right. Accordingly, the size of the specific region 730 placed in the second state may be varied and then restored after a predetermined period of time.

In this case, the controller 180 may execute at least one function associated with screen information displayed in a region placed in an erected state, namely, the second region 720, or screen information displayed in the second region 720 and specific region 730 in response to a change of the bent specific region 730 from the second state to the third state.

Specifically, the controller 180 may enter a different control command by pulling the second region 720 upward, pushing the second region 720 downward or tilting the second region 720 to the left or right. After a predetermined period of time has passed, the third state of the bent specific region 730 is restored to the second state again.

Figure 11A:
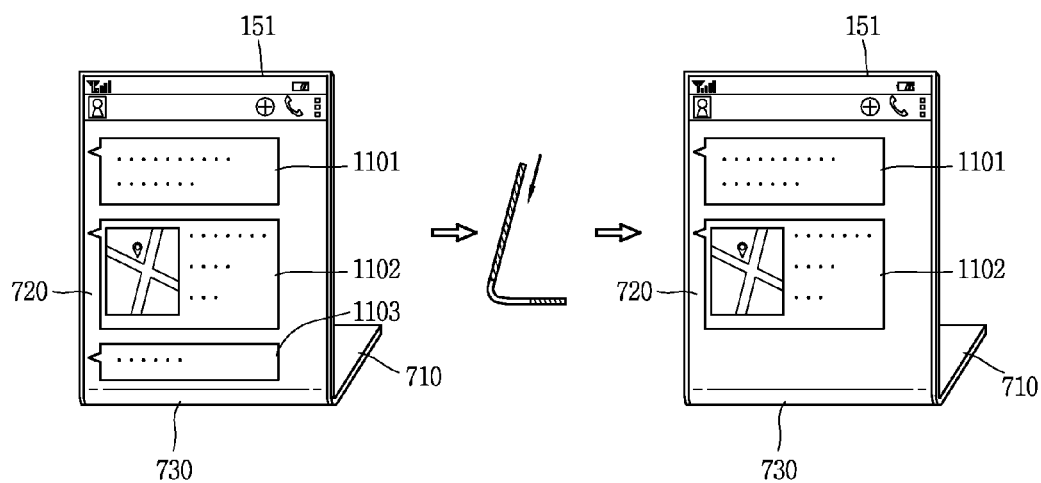
FIGS. 11A(a) to 11A(c), 11B(a) and 11B(b), 11C and 11D(a) to 11D(c) are conceptual views illustrating various examples of pulling, pushing the deformed specific region or tilting it to the left or right to enter a different control command in a mobile terminal according to still another embodiment of the present disclosure.
Figure 11A:
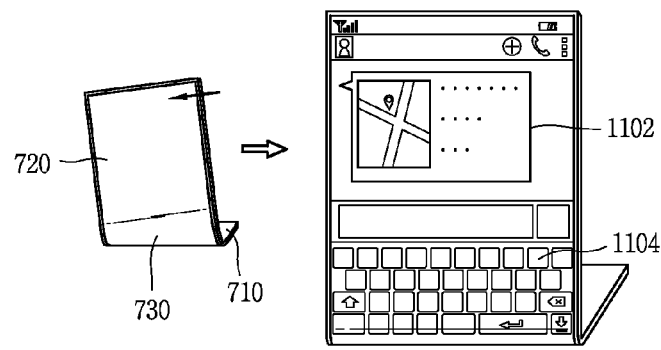
Figure 11A:
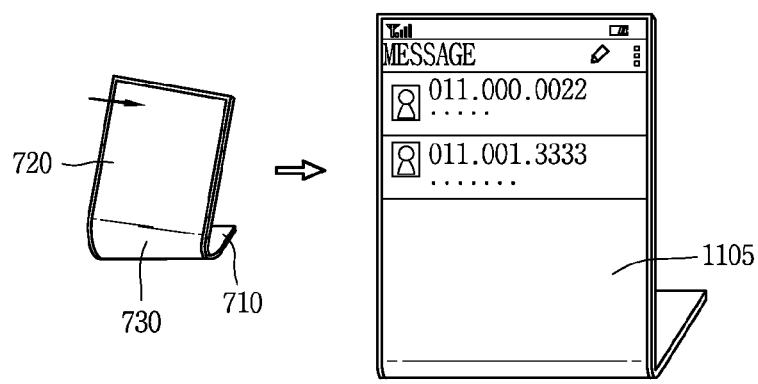

For an example, FIGS. 11A(a) to 11A(c) illustrate an embodiment of controlling a screen in a state that an execution screen of a message application is displayed on the display unit 151. As illustrated in FIG. 11A(a), when the second region 720 is held and pushed downward, the most recently transmitted and received message 1103 is deleted. Furthermore, an edit screen 1104 for writing a message is displayed when the second region 720 is tilted to the left as illustrated in FIG. 11A(b), and it is switched to a message list screen 1105 which is an upper item of the currently displayed screen when the second region 720 is tilted to the right as illustrated in FIG. 11A(c).

Figure 11B:
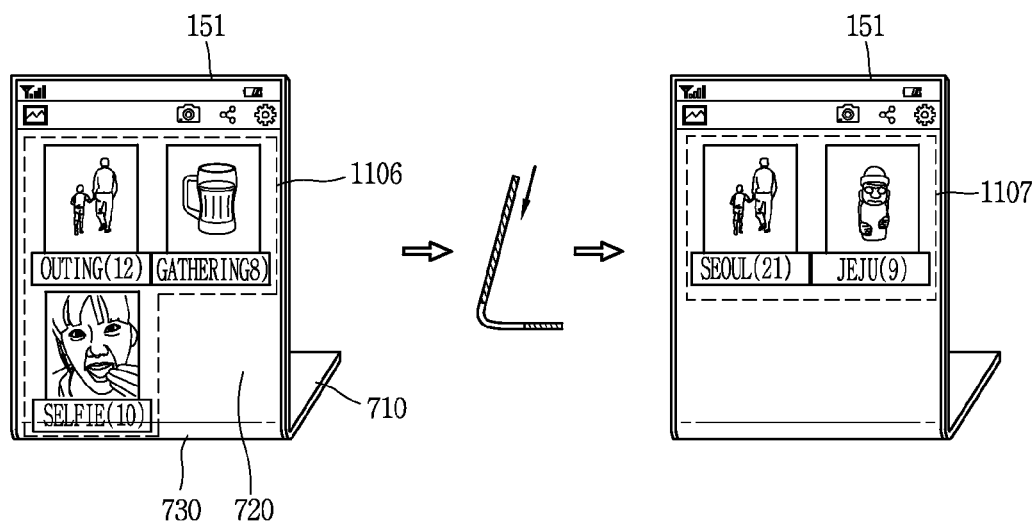
Figure 11B:
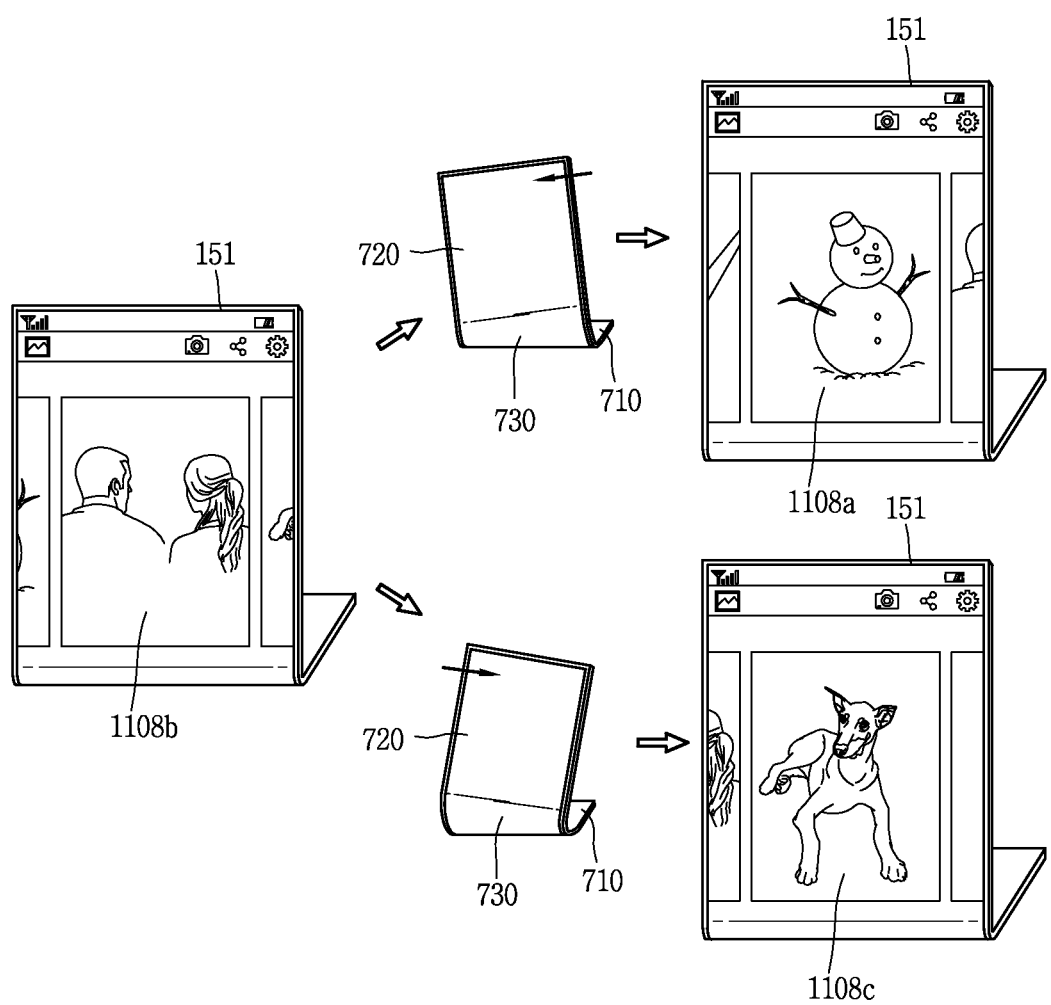

For another example, FIGS. 11B(a) and 11B(b) illustrate an embodiment of controlling a screen in a state that an execution screen of a gallery application is displayed on the display unit 151. As illustrated in FIG. 11B(a), when the second region 720 is held and pushed downward, images are arranged in a different manner. For example, images may be arranged from a user defined classification scheme 1106 to a location based classification scheme 1107. Furthermore, a previous image 1108 of the specific image 1108b may be displayed when the second region 720 is tilted to the left as illustrated in FIG. 11B(b), and a next image 1108c of the specific image 1108b may be displayed when the second region 720 is tilted to the right as illustrated in FIG. 11B(b).

Figure 11C:
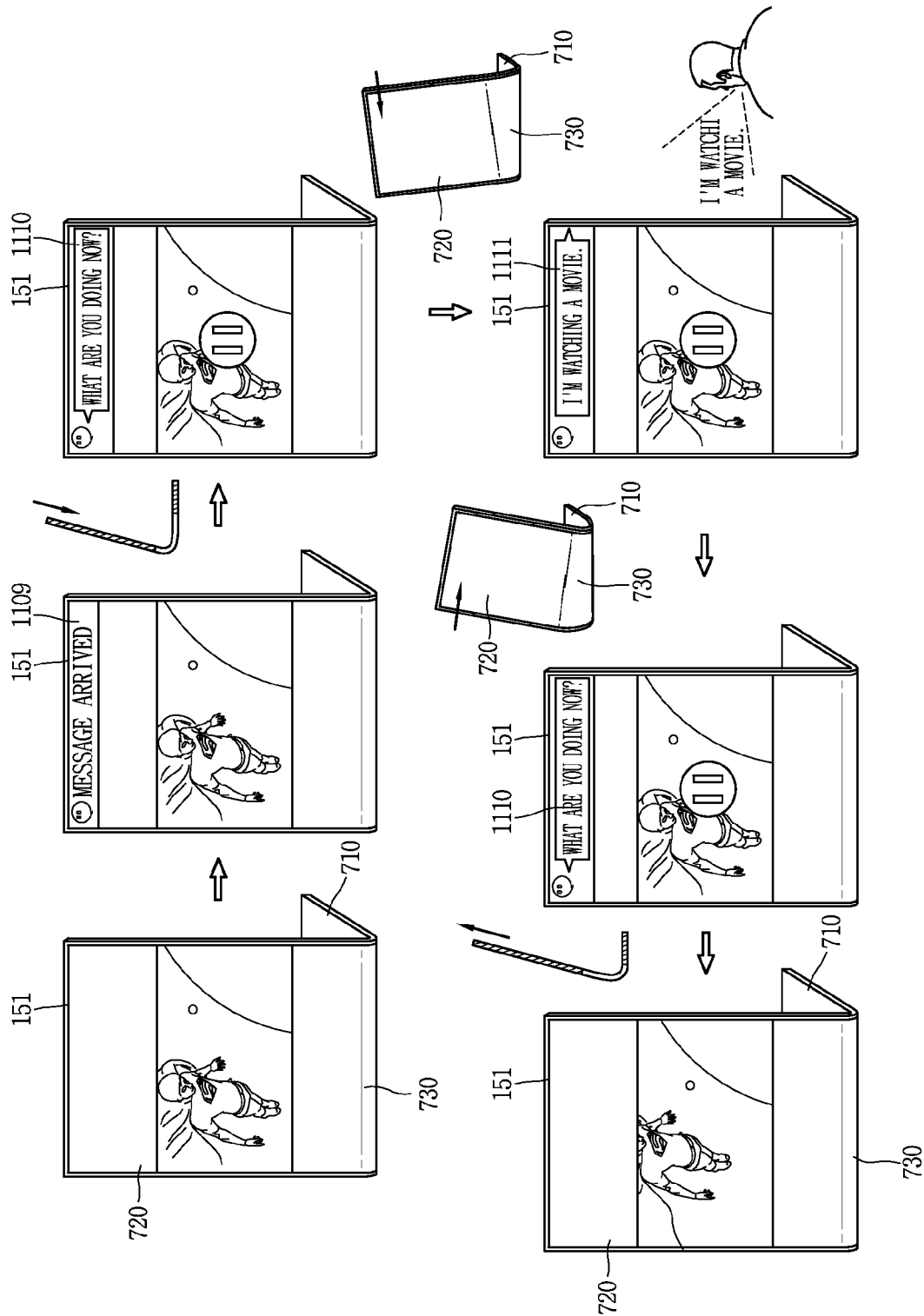

For still another example, FIG. 11C illustrates an embodiment of processing a received event without ending video when the event is received while displaying the video on the display unit 151.

When a message is received while displaying video on the display unit 151, an icon 1109 indicating that the message has been received is displayed at an upper end of the second region 720. According to an embodiment, when the user pushes the second region 720 downward, the video is suspended, and an indicator 1110 displayed with the content of the received message is displayed at an upper end of the second region 720.

In this state, when the second region 720 is tilted to the left, the mobile terminal 100 may enter a message edit mode.

Specifically, when the second region 720 is tilted to the left, a voice recognition function and a speech to text (STT) function of the mobile terminal are activated, and thus the user's voice is written as a response message. The written message is displayed at an upper end of the second region 720, and the suspend state of the video is maintained while writing the message.

On the other hand, when the second region 720 is tilted to the right, an exit from the edit mode is carried out (accordingly, the voice recognition function and speech to text (STT) function can be switched to an inactive state), and previously a received message is displayed at an upper end of the second region 720. Furthermore, when the second region 720 is pulled upward, the suspended video is played again, and the display of an icon indicating the received message disappears.

Figure 11D:
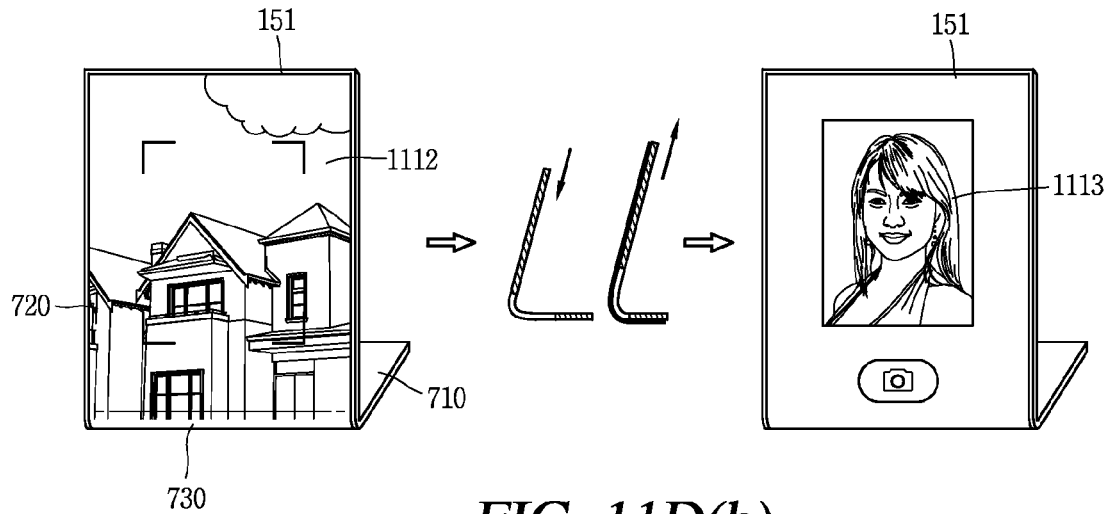
Figure 11D:
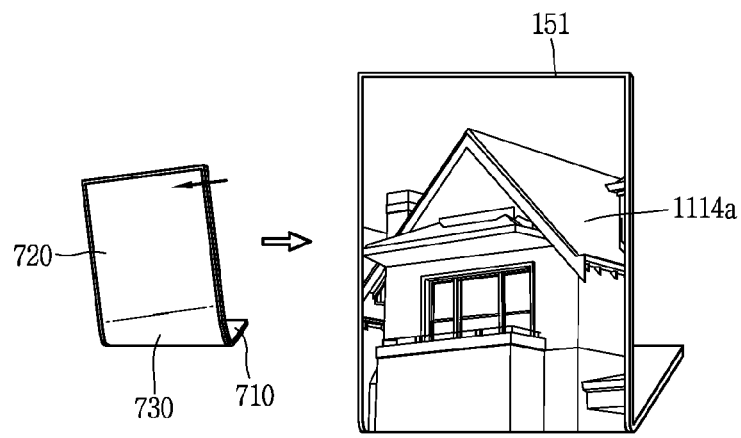
Figure 11D:
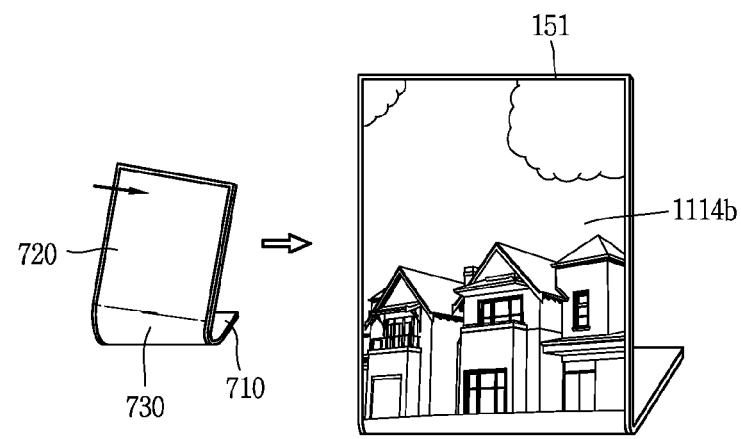

For another example, FIGS. 11D(a) to 11D(c) illustrate an embodiment of controlling a screen in a state that an execution screen of a camera application is displayed on the display unit 151. To this end, the mobile terminal may include a first camera 121a disposed on a front surface thereof and a second camera 121b disposed on a rear surface thereof.

When the second region 720 is held and pushed downward in a state that a preview screen corresponding to a first capture mode using the second camera 121b is displayed as illustrated in FIG. 11D(a), the capture mode is changed. Accordingly, a preview screen corresponding to the second capture mode using the first camera 121a is displayed on the display unit 151.

Furthermore, when the second region 720 is tilted to the left as illustrated in FIG. 11D(b) in a state that a preview screen corresponding to the first capture mode or the second capture mode is displayed, a zoom-in function for the preview screen is carried out. Then, when the second region 720 is tilted to the right as illustrated in FIG. 11D(c), a zoom-out function for the preview screen is carried out.

As described above, according to a mobile terminal and a control method thereof according to the embodiments of the present disclosure, the physical shape of a display unit, part of which can be bent or flexed, may be changed and notified during the occurrence of an event, thereby providing a new type of convenience and fun to the user. Furthermore, an event may be processed in a different manner using a push input applied to the deformed specific region, thereby providing a new form of input environment. Moreover, using a display unit, part of which is bent or flexed, part of the display unit may be used on the bottom and another part thereof in an erected shape to be suitable for the user's audio-visual environment. In addition, a control command may be entered in a new manner in which the another part thereof is pulled, pushed or tilted in such a shape, thereby providing user convenience.

The foregoing present disclosure may be implemented as codes readable by a computer on a medium written by the program. The computer-readable media includes all types of recording devices in which data readable by a computer system can be stored. Examples of the computer-readable media may include HDD (Hard Disk Drive), SSD (Solid State Disk), SDD (Silicon Disk Drive), ROM, RAM, CD-ROM, a magnetic tape, a floppy disk, an optical data storage device, and the like, and also include a device implemented via a carrier wave (for example, transmission via the Internet).

Furthermore, the computer may include the controller 180 of the mobile terminal. The detailed description is, therefore, not to be construed as restrictive in all respects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a display comprising a first region and a second region, wherein during a first state the first and second regions are planar and during a second state the first region is planar and the second region is deformed to protrude relative to the first region; and
   a controller configured to:
      cause the second region to protrude relative to the first region during the second state when an event has occurred in an application;
      cause the display to display an icon relating to the event during the second state; and
      execute a function associated with the event when the second state is switched to the first state,
      wherein the second region comprises a first portion in which the icon is displayed and a second portion in which screen information that was displayed in the first state is displayed during the second state,
      wherein the controller limits input of a control command to the second portion when a touch input is received at the second region during the second state.

2. The mobile terminal of claim 1, wherein the controller is further configured to:
   cause the display to terminate the displaying of the icon when the second state is switched to the first state in response to an external force applied to the second region.

3. The mobile terminal of claim 1, wherein the controller is further configured to:
   cause the display to display a screen corresponding to execution of a function associated with the event on the display when the second state is switched to the first state in response to an external force applied to the second region.

4. The mobile terminal of claim 1, further comprising:
   a wireless communication unit configured to receive information;
   wherein the controller is further configured to:
   cause the display to display an indicator indicating that the information is received in the first region of the display;
   cause the display to display the received information at the second region; and
   cause the display to terminate the displaying of the indicator when the second state is switched to the first state in response to an external force applied to the second region.

5. The mobile terminal of claim 4, wherein the controller is further configured to:
   cause the display to maintain the displaying of the indicator after the second state is switched to the first state when a plurality of touch inputs are consecutively received at the second region while the indicator is displayed.

6. The mobile terminal of claim 1, wherein the icon is displayed in the second region during the second state.

7. The mobile terminal of claim 1, wherein the controller is further configured to:
   cause the display to display guide information in the second region during the second state, wherein the guide information indicates an executable function.

8. The mobile terminal of claim 1, wherein the first region includes a first part and a second part divided based on the second region; and
   wherein the controller is further configured to:
   causing the display to visually move information displayed within the second region in response to a touch input to at least one of the first part or the second part of the first region during the second state and while the icon is displayed.

9. The mobile terminal of claim 8, wherein the controller is further configured to:
   cause the display to display an input window in response to a drag input to either one of the first part or the second part of the first region, wherein the input window permits data entry associated with the event.

10. The mobile terminal of claim 9, wherein the controller is further configured to:
    cause the display to display information input via the input window at the second region, wherein the executed function comprises a transmission that includes the displayed information.

11. The mobile terminal of claim 9, wherein the controller is further configured to:
    cause the display to display the input window in an orientation determined by a direction of the drag input; and
    cause the display to display information associated with the event in another one of the first part or the second part of the first region when the second state is switched to the first state.

12. The mobile terminal of claim 1, further comprising:
a wireless communication unit configured to receive a call signal, wherein the event is the receiving of the call signal and the icon indicates that the call signal has not been answered; and
wherein the controller is further configured to:
cause the display to display an indicator at the second region indicating that the call signal is received.

13. The mobile terminal of claim 12, wherein the controller is further configured to:
cause the display to display a notification icon in the second region indicating that the call signal is released from connection and the call signal is rejected when the second state is switched to the first state.

14. The mobile terminal of claim 12, wherein the controller is further configured to:
connect the call signal when a first touch input is received at the displayed indicator at the second region; and
cause the display to display screen information for transmitting a reject message for the call signal when a second touch input is received at the displayed indicator.

15. The mobile terminal of claim 1, wherein the controller is further configured to:
cause the display to switch from the second state to the first state when a plurality of drag inputs are received at the first and second regions in opposing directions and with increasing smaller distances between respective drag inputs; and
cause the display to display the icon for a defined time interval after the second state is switched to the first state.

16. The mobile terminal of claim 15, wherein when a touch input is received at the displayed icon in a state that a pressure to a plurality of touch positions applied to the first and second regions is maintained, the controller sequentially executes a first function associated with the event and a second function associated with the first function.

17. The mobile terminal of claim 1, further comprising:
a wireless communication unit configured to transmit and receive wireless signals;
wherein when a call signal is received through the wireless communication unit in a state that the display is in an inactive state, the controller is configured to switch the second region to an active state while the display is in the second state and maintains the first region of the display in an inactive state while the display is in the second state.

18. The mobile terminal of claim 1, wherein the first region includes a first part and a second part divided based on the second region, and further comprises a sensing unit configured to sense a change to a third state in which part of the second region varies by an external force being applied to another part of the second region in a state that either one of the first part or the second part is placed on a bottom surface and the other part is erected based on the second region as the second region is placed in the second state; and
wherein the controller is further configured to:
control at least one function associated with screen information that has been displayed on the other one of the first part or the second part to be executed in response to the second region being switched from the second state to the third state; and
controls the second region to switch from the third state to the second state subsequent to a predetermined period of time.

\* \* \* \* \*